US008475271B2

(12) United States Patent
Okada

(10) Patent No.: US 8,475,271 B2
(45) Date of Patent: Jul. 2, 2013

(54) GAMING APPARATUS

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 696 days.

(21) Appl. No.: 12/183,757

(22) Filed: Jul. 31, 2008

(65) Prior Publication Data

US 2008/0293489 A1 Nov. 27, 2008

Related U.S. Application Data

(63) Continuation of application No. 11/858,463, filed on Sep. 20, 2007, now abandoned, which is a continuation-in-part of application No. 10/442,198, filed on May 21, 2003, now Pat. No. 7,288,026.

(30) Foreign Application Priority Data

May 21, 2002 (JP) ................................ 2002-146803

(51) Int. Cl.
*A63F 13/02* (2006.01)
*A63F 13/10* (2006.01)
*G07F 17/32* (2006.01)
*A63F 9/24* (2006.01)

(52) U.S. Cl.
CPC .......... *G07F 17/323* (2013.01); *G07F 17/3225* (2013.01); *G07F 17/3211* (2013.01); *G07F 17/3272* (2013.01); *A63F 2009/245* (2013.01)
USPC .............................................. 463/31; 463/42

(58) Field of Classification Search
CPC . G07F 17/3225; G07F 17/323; G07F 17/3272; G07F 17/3211; A63F 2009/245; A63F 13/02; A63F 13/10
USPC ................ 463/30, 31, 40–42, 16, 20, 26–28, 463/25, 11–13, 17–19, 29, 43
See application file for complete search history.

(56) References Cited

U.S. PATENT DOCUMENTS 4,213,524 A * 7/1980 Miyashita et al. ............ 194/211
4,553,748 A 11/1985 Allen et al.

(Continued)

FOREIGN PATENT DOCUMENTS

DE 19533418 7/1996
EP 0619128 10/1994

(Continued)

*Primary Examiner* — David L Lewis
*Assistant Examiner* — Matthew D. Hoel
(74) *Attorney, Agent, or Firm* — Lexyoume IP Meister, PLLC.

(57) ABSTRACT

A gaming system includes a control and management device which determines a link attraction based on gaming information sent from each of a plurality of gaming apparatuses. The control and management device identifies a target gaming apparatus in which a prize is generated and at least one neighboring gaming apparatus, based on the gaming information. The control and management device judges whether the link attraction for the plurality of gaming apparatuses has already been determined, when the gaming information is winning information. Further, the control and management device determines the link attraction by reference to a link attraction mode lottery table stored in a memory, if it is determined the link attraction has not yet been determined. The control and management device determines a unit number and, subsequently, sends the link attraction to the target gaming apparatus with the unit number and the at least one neighboring gaming apparatus.

4 Claims, 53 Drawing Sheets

U.S. PATENT DOCUMENTS

| | | | | | |
|---|---|---|---|---|---|
| 4,573,681 | A | | 3/1986 | Okada | |
| 5,355,302 | A | * | 10/1994 | Martin et al. | 700/234 |
| 5,472,195 | A | * | 12/1995 | Takemoto et al. | 463/31 |
| 5,547,192 | A | * | 8/1996 | Ishibashi | 463/26 |
| 5,605,506 | A | * | 2/1997 | Hoorn et al. | 463/42 |
| 5,772,509 | A | | 6/1998 | Weiss | |
| 6,174,234 | B1 | * | 1/2001 | Seibert et al. | 463/20 |
| 6,217,448 | B1 | * | 4/2001 | Olsen | 463/25 |
| 6,923,720 | B2 | * | 8/2005 | Loose | 463/16 |
| 2002/0042295 | A1 | | 4/2002 | Walker et al. | |
| 2003/0109304 | A1 | * | 6/2003 | Gauselmann | 463/30 |
| 2003/0130033 | A1 | * | 7/2003 | Loose | 463/30 |
| 2006/0121967 | A1 | * | 6/2006 | Paulsen et al. | 463/16 |

FOREIGN PATENT DOCUMENTS

| | | |
|---|---|---|
| EP | 0981119 | 2/2000 |
| JP | H03-0723130 B2 | 11/1991 |
| JP | 6-296726 | 10/1994 |
| JP | 10-174740 | 6/1998 |
| JP | 11-244471 | 9/1999 |
| JP | 2001-87452 | 4/2001 |
| JP | 2001-327650 | 11/2001 |
| JP | 2001-327653 | 11/2001 |
| JP | 2002-52120 | 2/2002 |
| JP | 2002-224283 | 8/2002 |
| JP | 2003-47779 | 2/2003 |
| JP | 2003-53041 | 2/2003 |
| JP | 2003-62159 | 3/2003 |
| JP | 2003-111891 | 4/2003 |
| JP | 2003-111897 | 4/2003 |
| JP | 2003-117073 | 4/2003 |
| JP | 2003-144646 | 5/2003 |
| JP | 2003-144707 | 5/2003 |
| JP | 2003-144709 | 5/2003 |
| JP | 2003-154078 | 5/2003 |
| JP | 2003-159379 | 6/2003 |
| JP | 2003-159381 | 6/2003 |
| JP | 2003-164576 | 6/2003 |
| JP | 2003-190412 | 7/2003 |
| JP | 2003-190445 | 7/2003 |
| JP | 2003-190528 | 7/2003 |
| JP | 2003-190531 | 7/2003 |
| JP | 2003-199886 | 7/2003 |
| JP | 2003-199933 | 7/2003 |
| JP | 2003-199941 | 7/2003 |
| JP | 2003-199942 | 7/2003 |
| JP | 2003-199943 | 7/2003 |
| JP | 2003-210692 | 7/2003 |
| WO | 01/19475 | 3/2001 |

* cited by examiner

Fig. 6

| | Left reel (9L') | Middle reel (9C') | Right reel (9R') |
|---|---|---|---|
| 21 | Red 7 | Red 7 | Red 7 |
| 20 | Cherry | Replay | Bell |
| 19 | Bell | Watermelon | Replay |
| 18 | Replay | 7 with sword | 7 with sword |
| 17 | 7 with sword | Bell | Watermelon |
| 16 | Red 7 | 7 with sword | Bell |
| 15 | Bell | Replay | Replay |
| 14 | Replay | BAR | 7 with sword |
| 13 | 7 with sword | Bell | BAR |
| 12 | Cherry | 7 with sword | Bell |
| 11 | Bell | Replay | Replay |
| 10 | Replay | Watermelon | 7 with sword |
| 9 | BAR | BAR | Watermelon |
| 8 | 7 with sword | Bell | Red 7 |
| 7 | Bell | 7 with sword | Bell |
| 6 | Replay | Replay | Replay |
| 5 | 7 with sword | Cherry | 7 with sword |
| 4 | Watermelon | Replay | Cherry |
| 3 | Bell | Bell | Bell |
| 2 | Replay | 7 with sword | Replay |
| 1 | 7 with sword | Bell | 7 with sword |

Fig. 7

| Symbol combination | In Common gaming (In bonus internal winning) | Common gaming in BB | JAC (pattern) gaming |
|---|---|---|---|
| Red 7—Red 7—Red 7 | 15+BB | | |
| BAR—BAR—BAR | 15+RB | | |
| 7 with sword—7 with sword—7 with sword | 15+SB | | |
| Watermelon—Watermelon—Watermelon | 3 | 15 | |
| Bell—Bell—Bell | 6 | 7 | |
| Cherry—ANY—ANY | 1 | 1 | |
| Replay—Replay—Replay | Replay | 1+RB | 15 |

Fig. 8

| Table No. | left middle right | left right middle | middle left right | middle right left | right left middle | right middle left |
|---|---|---|---|---|---|---|
| 1 | ○ | × | × | × | × | × |
| 2 | × | ○ | × | × | × | × |
| 3 | × | × | ○ | × | × | × |
| 4 | × | × | × | ○ | × | × |
| 5 | × | × | × | × | ○ | × |
| 6 | × | × | × | × | × | ○ |

○ ··· prize
× ··· not prize

* ··· The timing of frame press is free.

Fig. 9

| Winning pattern | Random number range | confirmation |
|---|---|---|
| SB | 0~2298 | 2299/16384 |
| Bell | 2299~11024 | 8726/16384 |
| Watermelon | 11025~11165 | 141/16384 |
| Cherry | 11166~11385 | 220/16384 |
| Replay | 11386~13630 | 2245/16384 |
| BB | 13631~13668 | 38/16384 |
| RB | 13669~13696 | 27/16384 |
| Loss | 13697~16383 | 2686/16384 |

Random number range: 0~16383

Fig. 10

Start command

| | |
|---|---|
| 1 | Internal winning pattern |
| 2 | SB |
| | Bell |
| | Watermelon |
| | Cherry |
| | Replay |
| | BB |
| | RB |
| | Loss |
| 3 | Gaming status |
| 2 | In Common gaming |
| | In RB internal winning |
| | In BB internal winning |
| | RB in operation |
| | BB in operation |
| | |
| | |
| | |
| 5 | Selection stop table |
| 6 | Table No.1 |
| | Table No.2 |
| | Table No.3 |
| | Table No.4 |
| | Table No.5 |
| | Table No.6 |
| | |
| | |
| 7 | Inlet coin number |
| 8 | 1 |
| | 2 |
| | 3 |
| | |
| | |
| | |
| | |
| | |

Reel stop command

| | |
|---|---|
| 1 | Stop order |
| 2 | First stop |
| | Second stop |
| | Third stop |
| | |
| | |
| | |
| | |
| | |
| 1 | Stop reel |
| 2 | Left reel |
| | Middle reel |
| | Right reel |
| | |
| | |
| | |
| | |
| | |

1 gaming completion command

| | |
|---|---|
| 1 | Prize type |
| 2 | SB |
| | Bell |
| | Watermelon |
| | Cherry |
| | Replay |
| | BB |
| | RB |
| | Loss |
| 1 | Bonus gaming state |
| 2 | Common gaming 1 in BB |
| | Common gaming 2 in BB |
| | Common gaming 3 in BB |
| | RB Gaming 1 |
| | RB Gaming 2 |
| | RB Gaming 3 |
| | RB completion |
| | BB completion |

Fig. 11

| |
|---|
| Receipt flag |
| BR continuance number counter |
| BR flag |
| BR evacuation flag |
| Attraction lottery processing random number |

Fig. 20

| | |
|---|---|
| 1 | Transmission source information |
| 2 | Game start information |
| 3 | — |

| | |
|---|---|
| 1 | Transmission source information |
| 2 | Inlet coin information |
| 3 | Number of inlet |

| | |
|---|---|
| 1 | Transmission source information |
| 2 | Payout coin information |
| 3 | Number of inlet |

| | |
|---|---|
| 1 | Transmission source information |
| 2 | Bonus prize generation information |
| 3 | Bonus categories |

| | |
|---|---|
| 1 | Transmission source information |
| 2 | Bonus gaming completion information |
| 3 | Bonus categories |

| | |
|---|---|
| 1 | Transmission source information |
| 2 | Bonus internal winning information |
| 3 | Bonus categories |

| | |
|---|---|
| 1 | Transmission source information |
| 2 | WIN lamp lighting information |
| 3 | ON/OFF |

| | |
|---|---|
| 1 | Transmission source information |
| 2 | Calling information |
| 3 | ON/OFF |

| | |
|---|---|
| 1 | Transmission source information |
| 2 | Error information |
| 3 | Generation/release |

Fig. 21

| Established flag | BR continuance number | | | |
|---|---|---|---|---|
| | 10 games | 50 games | 100 games | Loss |
| Watermelon | 0~10 | 11~13 | 14~15 | 16~127 |
| Two cherries | 0~6 | 7~10 | — | 11~127 |
| Loss | 0~14 | — | 15~24 | 25~127 |

Random number range: 0~1

Fig. 22 A

| Established flag | Attraction mode ① | Attraction mode ② | Attraction mode ③ |
|---|---|---|---|
| BB | 0~16 | 17~64 | 65~127 |
| RB | 0~87 | 88~105 | 106~127 |

Random number range: 0~127

Fig. 22 B

| WIN lamp lighting table | Attraction transmission destination | | | | |
|---|---|---|---|---|---|
| | A | B | C | D | E |
| A | 0~63 | 64~109 | 110~120 | 121~123 | 124~127 |
| B | 0~37 | 38~90 | 91~121 | 122~125 | 126~127 |
| C | 0~2 | 3~23 | 24~88 | 89~117 | 118~127 |
| D | 0~2 | 3~12 | 13~44 | 45~101 | 102~127 |
| E | 0~2 | 3~6 | 7~16 | 17~56 | 57~127 |

Random number range: 0~127

GAMING APPARATUS

The present application claims priority and is a continuation-in-part of U.S. patent application Ser. No. 10/442,198, filed May 21, 2003 now U.S. Pat. No. 7,288,026, the content of which is hereby incorporated by reference in its entirety. The present application is a continuation of U.S. patent application Ser. No. 11/858,463, filed Sep. 20, 2007 now abandoned.

BACKGROUND OF THE INVENTION

1. Field of the Invention

The present invention relates to a symbol combination gaming apparatus such as a slot machine and a pachinko comprising a varying display means to varyingly display various symbols and a function to control the varying display to provide a player with a benefit depending on the result, and a gaming apparatus system using a hall management computer to manage a gaming history.

2. Related Art

A slot machine can be cited as typical example of this kind of gaming apparatus. The slot machine has a plurality of rotating reels, in which a plurality of symbols are provided on the circumference thereof. A prize is defined as a price state where a combination of symbols when each rotating reel stopped becomes same as a predetermined stopping state, i.e., the same symbols line up on a pay line specified by the player, it is so configured that a predetermined amount of coin or giveaway is paid out. In general, types of contingency are often added to obtain this prize. The gaming apparatus is characterized by contingency that a player cannot totally control the result of a game with his skill.

In order to realize the "contingency", various methods have been adopted. Recently, a control method called "pre-judgment" to control reels to stop depending on the result of the lottery after carrying out a prize lottery through software with a microcomputer is adopted in a slot machine. For example, a slot machine described in Japanese Patent No. 1991-72313 is a so called pachi-slot gaming machine with stop buttons, comprising a random number sampling means to sample a random number based on the start lever operation by a player, and a prize probability table separated into each random number range of "big hit", "mid hit" and "small hit" depending on the largeness of a prize pattern. Then it judges that the prize pattern wins to establish a hit (winning) flag of the relevant prize pattern if a sampled random number falls on the winning section of the prize probability table. These winning flags include the winning flag of the prize pattern called "small prize pattern" in which about ten pieces of coins are discharged by matching predetermined symbols (e.g., "bell" or "cherry") on an effective prize line, and the one called a "bonus pattern" a state to generate a prize more easily than normal gaming states during a predetermined times of gaming, to payout about 100 to 400 pieces of coins by predetermined symbols matched (e.g., "7" or "BAR" symbol).

The state of winning flag established is the one called "internal winning" in general. A related prize pattern is just allowed to be lined up on the prize line and no prize is generated actually. In order to generate a prize, rotating prize symbols shall be controlled with a timing to stop them on a prize line (normally, within four frames). This operation is called "frame press". If this operation timing is bad, prize is not generated though an internal winning is generated. This state is called "missed winning".

This missed winning, in a large sense, may be caused by the missed frame press. The causes include some patterns. First, an aimed symbol has been determined, however, a player can not recognize varying symbols and stops reels at a rough estimate to fail. Second, there are plural prize patterns that may win within the current game, and a player does not know which symbol to be stopped and fail.

In the former case, a player can improve the accuracy in some measure if he is skilled in the frame press technique. However, in the latter case, a play must understand the internal winning state which can not be seen from outside. However much a player skilled in the frame press, it is not possible to improve the accuracy of the frame press.

On the contrary, if an internal winning pattern is informed, it is possible to realize gaming states such as a bonus gaming in which a lot of coins are obtained even in the ordinary gaming state. There are gaming apparatuses with a function called "Assist Time (AT)", function that reduces missed winning and pays out a larger amount of coins than normal gaming, by taking advantage of gaming property specific to pachinko-slots, when predetermined conditions are met, by reporting an internal winning, further, a type of the internal winning pattern during a predetermined period. A state during AT falls into the category of the "gaming state" mentioned below. But it is possible to specify to practically pay out coins comparable to that of the bonus gaming.

There is also a function "Super Time (ST)" that changes the amount of coins paid out depending on whether winning of "internal winning state" is supported or not. When a rotating reel is controlled to stop by the operation of a stop button by a player, plural "stop tables" for determining the number of frames slipped from the pattern position at which the stop operation has been carried out are provided, a stop table is selected by random number lottery every times when a winning pattern is internal selected. The stop control of the function is composed that no winning is generated, even if buttons are so pressed in the timing of the frame press that the reel can stop on the effective winning line, unless a stop operation is carried out in order of the stop operation specified in the stop table. The function of ST realizes a large number of coins comparable to the bonus gaming as "AT function" mentioned above by assigning an "announced" state of the type of the stop table selected and an "unannounced" state of that to the selected stop table.

As shown above, a gaming state in which a large number of coins can be obtained other than the bonus gaming is called "particular game" in the present invention. Including specific game and bonus gaming state in which a large number of coin payout is carried out is called "special game".

A player plays games hoping these special games occur. Regardless to say, the probability of a special game changes depending on the business policy of a parlor. For example, a parlor offers a large number of coins to players in a so called service day with a higher probability of special game, or makes profits by reducing payout in a day of profit collection. Further, in the same parlor and time, some gaming apparatuses easily offer special games and others not. In general, in present-day pachinko parlors (parlors), the operation data of gaming apparatuses are collected in real time and states of gaming apparatuses are monitored. They gain appropriate business profits by aggregating the gaming data outputted by gaming apparatuses with a parlor management computer and adjusting probability of special games based on the data analysis.

Specifically, probability of special games is changed by changing the payout rate occurrence by changing the setting switch to adjust the probability of occurrence of special games built in each gaming apparatus. In general, a player can not recognize the setting state. However, a player can recognize the probability of occurrence of special games if he can know the number of generated special games and the game number until then even if he can not confirm the setting of a gaming apparatus. Players have strongly requested construction of a system to confirm the past gaming history of gaming apparatuses.

In this situation, a system where a gaming information display unit to display current gaming record of a gaming apparatus by utilizing a gaming apparatus data collection system of a parlor is located on the way from a gaming apparatus to a parlor management computer and a player can confirm the display for making decision in selecting a gaming apparatus, has been proposed. The information display device is installed at the upper side of each gaming apparatus to offer various gaming apparatus information to players.

On the other hand, gaming apparatuses to offer various attractions using liquid crystal displays and stereo speakers with attraction control board improved significantly have been proposed. Attractions include information of an establishment of an internal winning flag, a suggestion of an appropriate operation method, execution of prize attraction, attraction during a bonus, etc. Attractions are controlled depending on the gaming states. In these attraction controls, players are greatly interested in an attraction to inform the internal winning of bonus pattern mentioned above, an attraction to inform an internal winning pattern established during AT gaming, an attraction to inform an appropriate stop procedure during ST gaming and so on, and the above attractions are essential parts of representations installed in a pachi-slot gaming machine.

However, at present, though various attractions are offered, gaming control information that is a basis to determine the content of attraction is limited to a single gaming apparatus and variation of attraction is likely to be confined.

Represented units have been confined to a single gaming apparatus. Players are likely to focus on a gaming apparatus that he is using. A lot of gaming apparatuses located in a parlor are not utilized effectively on the attraction basis.

SUMMARY OF THE INVENTION

An object of the present invention is to provide a gaming system with a new gaming property by excluding limitations caused by attraction controls of gaming apparatuses on a single unit basis and utilizing many gaming apparatuses located in a parlor reciprocally.

A gaming system according to the present invention comprises a gaming apparatus for executing lottery of a prize pattern based on a predetermined input signal and offering profits to a player when a winning is generated, a control and management means for storing gaming information sent from the plural gaming apparatuses, a display means for controlling the display of an attraction based on the gaming information, in which the control and management means is provided with a link attraction determination means to determine an execution of a link attraction referring to the gaming information.

The present invention relates to a slot machine with a stop button for determining whether a prize is generated, a so called pachi-slot gaming machine as a gaming apparatus to generate various gaming information, that judges winning or non-winning of an internal winning pattern determined by the random number lottery process and whether rotating reels are operated with an appropriate timing, outwardly send the bonus winning information generated by gaming operation of a player through an external output control circuit.

The gaming information sent is gathered in a management server as a parlor management computer through LAN constructed in a parlor. The management server determines a link attraction carried out by a link attraction determination means and sends an attraction data.

The link attraction determination means further comprises a link attraction mode determination means to determine an attraction mode of a link attraction, monitors whether gaming information sent from each gaming apparatus includes bonus internal winning information, and decides a link attraction mode if bonus internal winning information is included with a link attraction mode lottery table.

Further, a gaming system according to the present invention may include a gaming apparatus for executing lottery of a prize pattern based on a predetermined input signal and offering profits to a player when a prize is generated, a gaming information display device for receiving gaming information sent from the gaming apparatuses and displaying the gaming information, a control and management means for storing gaming information sent from the plural gaming apparatuses, in which the control and management means is provided with a link attraction determination means to determine an execution of a link attraction referring to the gaming information, and a link attraction transmission means to send the link attraction determined by the link attraction determination means to the gaming information display device.

Link attraction data determined by the link attraction mode determination means is sent to a gaming information display device located corresponding to each gaming apparatus to carry out attraction control. In general, since a gaming information display device is located above a gaming apparatus, other players can recognize the attraction mode carried out. It is configured in such a manner players can recognize gaming apparatuses in which an attraction is being carried out.

Still further, another embodiment according to the present invention may include a lamp display part constituted of plural lamps and said link attraction is displayed with the mode of lighting of said lamp display part.

Since the lamp display part is composed of plural lamp groups and is larger than an attraction display device installed on a gaming apparatus, lighting/blinking control of each lamp carried out in accordance with an attraction mode determined by the link attraction mode determination means, is easily recognized distant from the gaming apparatus and a player can easily confirm at which gaming apparatus an attraction is being executed.

According to the present invention, a gaming system may include a plurality of gaming apparatuses, each of which has identification information. The gaming system comprises: (a) first, second, and third gaming apparatuses, each of which executes a lottery of a prize pattern based on a predetermined input signal and pays what is earned to a player when a prize is generated, (b) a control and management device to store each gaming information sent from said each gaming apparatus, the each gaming information including identification information of the sending gaming apparatus, and (c) a display device provided to the each gaming apparatus to control an attraction display based on the stored gaming information; wherein said control and management device is provided with a link attraction determination device to determine an execution of a link attraction by referring to the stored gaming information.

The gaming system may be characterized in that said display means is provided with a lamp display part composed of a plurality of lamps such that the link attraction is shown by blinking the lamps.

In the gaming system, the first gaming apparatus may be closer to the second gaming apparatus than the third gaming apparatus. Therefore, the second gaming apparatus may have more probability to generate the prize than the third gaming apparatus when the prize is generated with the first gaming apparatus.

Yet further, according to the present invention, a gaming system may include: a plurality of gaming apparatuses, each of which has a display device and pays out what is earned to a player when a prize is generated; a control and management device which determines a link attraction based on gaming information sent from each of the plurality of gaming apparatuses, in which the control and management device functions to (i) identify a target gaming apparatus in which a prize is generated and at least one neighboring gaming apparatus disposed in the vicinity of the target gaming apparatus from among the plurality of gaming apparatuses, based on the gaming information, and (ii) transmit the determined link attraction with an identifier of the target gaming apparatus and neighboring gaming apparatuses; and the display device of each of the target gaming apparatus and neighboring gaming apparatuses is operative to display the transmitted link attraction.

In the aforementioned gaming system, the display device of each of the target gaming apparatus and neighboring gaming apparatuses is operative to display a predetermined character after receiving the link attraction, in such a manner that the character moves from the display device of one of the neighboring gaming apparatuses toward the target gaming apparatus.

BRIEF DESCRIPTION OF THE DRAWINGS

FIG. 6 is a diagram showing series of symbols displayed along outer peripheral surfaces of reels.

FIG. 7 is a diagram showing a symbol combination and a payout number of each prize pattern.

FIG. 8 is a diagram showing a stop table selected when an internal winning of bell prize pattern occurs.

FIG. 9 is a diagram showing a prize probability table.

FIG. 10 is a diagram showing commands sent from a main control circuit to a sub-control circuit.

FIG. 11 is a diagram showing a major memory area of the sub-RAM.

FIG. 20 is a diagram showing data sent from a gaming information display device to a management server.

FIG. 21 is shows a BR generation and continuing number lottery table.

FIG. 22A shows a link attraction mode lottery table.

FIG. 22B shows a link attraction sending destination lottery table.

DETAILED DESCRIPTION OF THE INVENTION

A detailed description is provided below regarding embodiments of the present invention.

(First Embodiment)

A first embodiment of the present invention is described below.

Figure 1:
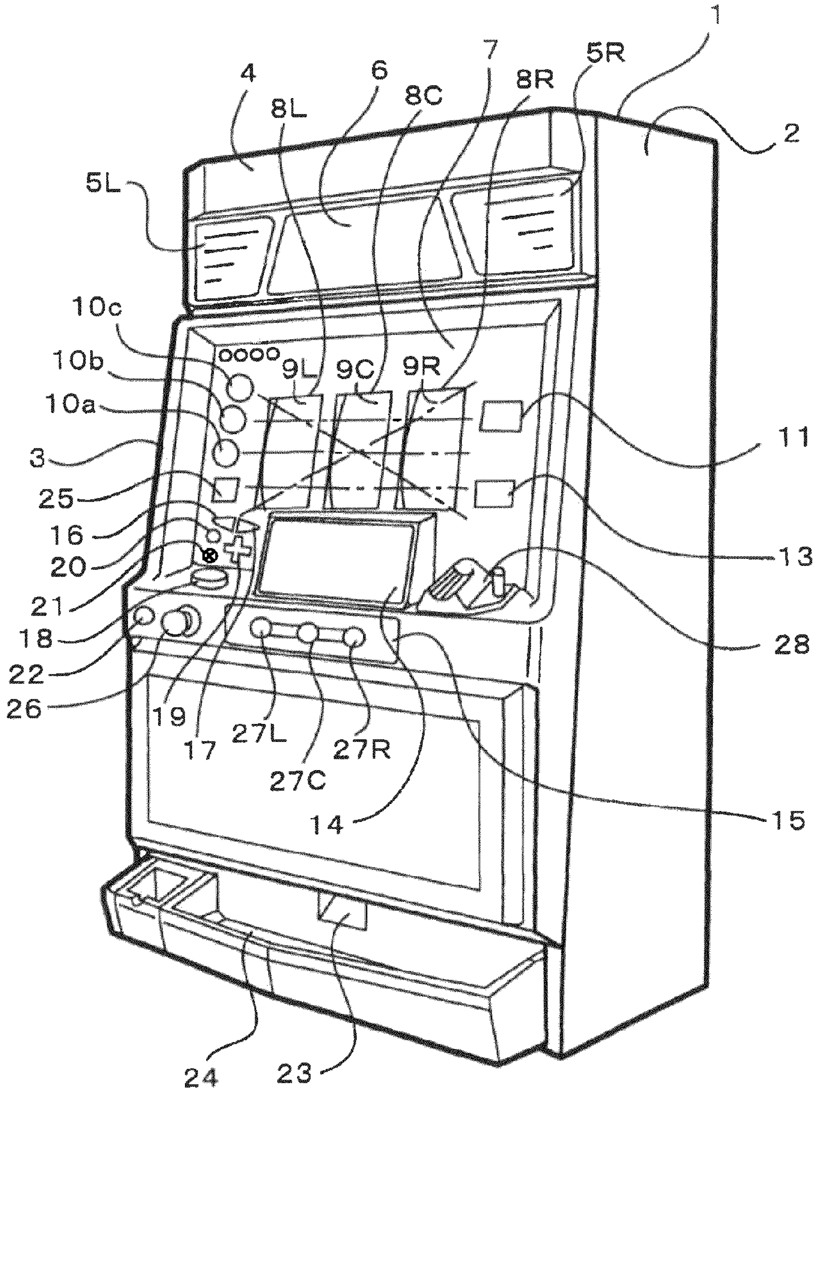
FIG. 1 is a perspective view of a pachi-slot gaming machine of an embodiment.

FIG. 1 is an external view of an embodiment of a gaming apparatus with stop buttons, a so-called pachi-slot gaming machine according to the present invention. A full door 3 is attached which is adapted to open and close to a plywood box-shaped cabinet 2 of a pachi-slot gaming apparatus 1. Above the full door 3, a gaming state display lamp 4 that lights up or flashes in different lighting manners corresponding to a bonus gaming, error and so on occurred, a speaker 5L and 5R generating effect sounds and error sounds during gaming, and a payout table 6 indicating payout numbers of each prize pattern and brief explanation of gaming are provided. A substantially vertical panel display part 7 is provided at the center of the full door 3, comprising three display windows that have rectangular shape with vertical long (left display window 8L, middle display window 8C, right display window 8R) at the center, allowing reels (left reel 9L, middle reel 9C, right reel 9R) in the cabinet to be seen. These reels 9L, 9C and 9R have multiple symbols provided that can rotate freely on the outer peripheral surfaces, configuring a varying display means with display windows 8L, 8C and 8R.

Figure 4:
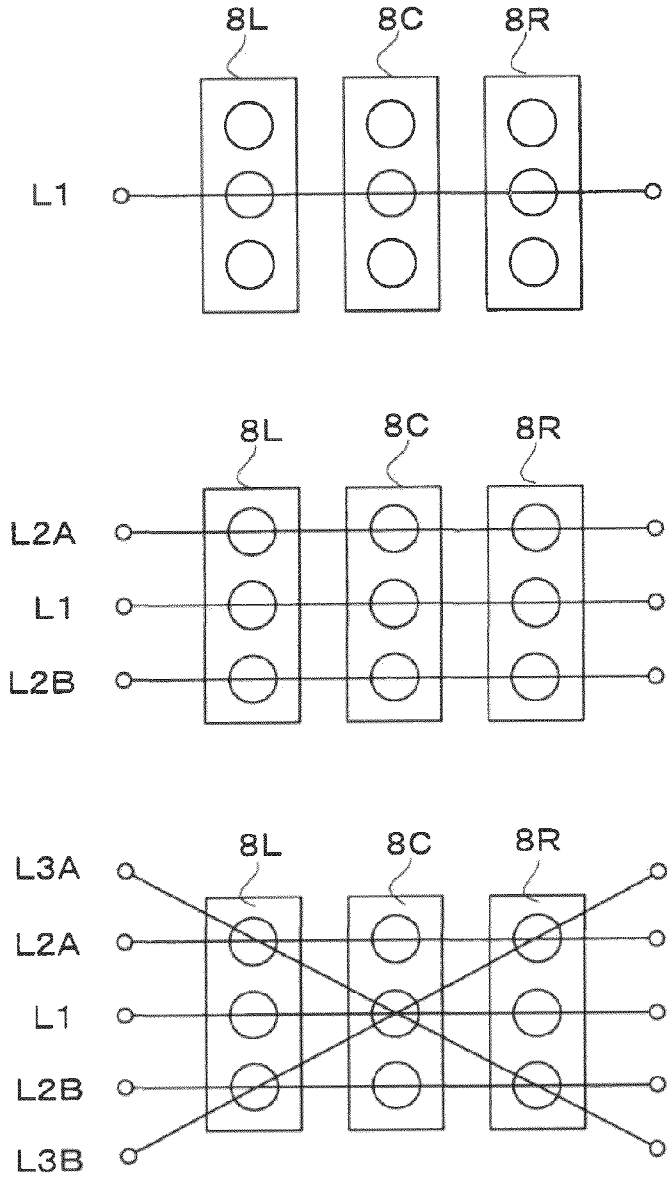
FIG. 4 is an enlarged view of a display window.

On the left of the panel display part, a 1-BET lamp 10*a* to light up when one or more coins are bet, a 2-BET lamp 10*b* to light up when two or more coins are bet, and a 3-BET lamp 10*c* to light up when three or more coins are bet are provided. As the enlarged drawings of display windows 8L, 8C and 8R shown in FIG. 4, when the 1-BET lamp 10*a* lights up, the center line L1 becomes an effective prize line (referred to as "enabled line" hereinafter), when the 2-BET lamp 10*b* lights up, the top line L2A and bottom line L2B are enabled as well as the center line L1 as an enabled line, when the 3-BET lamp 10*c* lights up, the cross down line L3A and cross up line L3B becomes enabled lines as well as the center line L1, top line L2A and the bottom line L2B.

On the right of the panel display part 7, an in-bonus information display part 11, payout display part 13 are provided. The in-bonus information display part 11 is configured with 7 segment LEDs and informs proceeding status mostly of the bonus gaming. Under the display windows 8L, 8C and 8R, a liquid crystal display device 14 to display various gaming history and attractions.

At the right side of the liquid crystal display device 14, a coin inlet 28 is provided. At the right side of the liquid crystal display device, a 1-BET switch 16, a 2-BET switch 17 and a MAXBET switch 18 are provided, beyond which a credit display part 25 is provided. If credited, one coin is bet in a game by depressing 1-BET switch 16 once. Two coins are bet in a game by depressing the 2-BET switch 17 once. Three coins that are the maximum number to be bet in a game are bet by depressing the MAXBET switch 18 once. As mentioned above, the predetermined prize line is enabled by operating these BET switches.

Among the 1-BET switch 16, the 2-BET switch 17 and the MAXBET switch 18, a cross button 19 to select and operate images such as gaming data displayed on the liquid crystal display device 14, a determination button 20 to confirm selected contents, and a cancel button 21 to cancel the selected contents and to return to a normal display from the selection screen or menu screen are provided.

Above the 1-BET switch 16 and the 2-BET switch 17, a credit display part 25 whose display part is configured with seven-segment LED is provided. Credit function is a function to reserve a range (for example, 50 coins) of coins in a gaming machine without paying out coins at prize. The credit display part 25 displays the number of currently reserved coins. Coins exceeding 50 are paid out to a coin tray 24.

A C/P (credit/payout) switch 22 for a player to switch receiving a payout or crediting the coins won in a game with an operation of a push button is provided at the left center of the full door 3. By the switching of the C/P switch 22, the coins paid out to the coin outlet 23 at the bottom of the full door, are reserved in the coin tray 24. A start lever 26 is provided so that it can be rotated freely within a predetermined angle at the right of C/P switch 22. When the start lever 26 is operated by a player, three reels 9L, 9C and 9R start rotating, and varying symbol display starts in the display window 8L, 8C and 8R.

At the center part of the full door 3, under the liquid crystal display device 14, a stop operation part 15 to stop the rotating three reels 9L, 9C and 9R one by one is provided constituting a stop means. The stop operation part 15 comprises a left stop button 27L, a middle stop button 27C and a right stop button 27R. A player can determine freely the order to depress these stop buttons 27L, 27C and 27R. In general, a stop operation carried out when all reels are rotating is called a "first stop operation", next stop operation is called a "second stop operation", and final stop operation is called a "third stop operation".

In this embodiment, depressing the left stop button 27L as the first stop operation is called a "normal depressing". Depressing the middle stop button 27C as the first stop operation is called a "middle depression". Depressing the right stop button 27R as a first stop operation is called a "reverse depression".

In the case of a gaming apparatus with three stop buttons, the total number of the stop operation order types is six. Operating the left stop button 27L as the first stop operation, the middle stop button 27C as the second stop operation and the right stop button 27R as the third stop operation is called "left middle right depression". Operating the middle stop button 27C as the first stop operation, the left stop button 27L as the second stop operation, right stop button 27R as the third stop operation is called "middle left right depression". Operating the middle stop button 27C as the first stop operation, the right stop button 27R as the second stop operation, the left stop button 27L as the third stop operation is called "middle right left depression". Operating the left stop button 27L as the first stop operation, right stop button 27R as the second stop operation and the middle stop button 27C as the third stop operation is called "left-right-middle depression". Operating the right stop button 27R as the first stop operation, the left stop button 27L as the second stop operation, the middle stop button 27C as third stop operation is called "right-left-middle depression" Operating the right stop button 27R as the first stop operation, the middle stop button 27C as the second stop operation and the left stop button 27L as the third stop operation is called "right-middle-left depression". A coin slot 28 is provided at the middle part of the full door 3 and right side of the liquid crystal display device 14.

Figure 2:
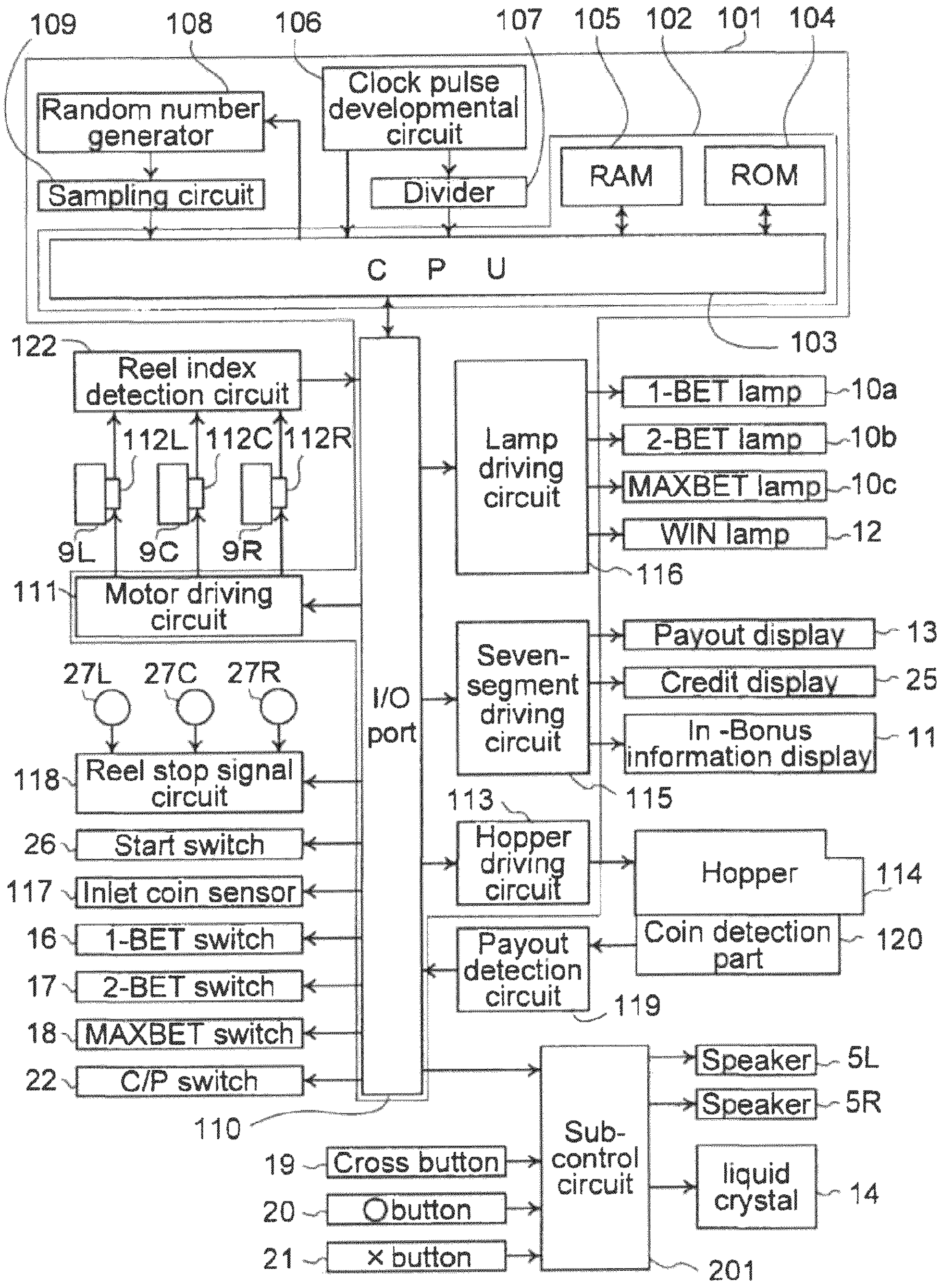
FIG. 2 is a block diagram showing a circuit for an operation of a pachi-slot gaming machine.

FIG. 2 is a block diagram of a circuit to realize the operation of the pachi-slot gaming machine 1 shown in FIG. 1. The gaming control means of this embodiment is configured of major two control circuits. A main control circuit 101 controls various types of peripheral devices connected electrically based on input signal from various detection means. A sub-control circuit 201 controls the gaming information sent from the main control circuit 101, attraction images displayed on the liquid crystal display device 14 based on the input signals from the cross button 19, determination button 20 and cancel button 21, and sound effects generated from the speaker 5L and 5R.

The main control circuit 101 is composed mainly of a microcomputer 102 setup on the circuit board with a circuit for random number sampling. The microcomputer 102 comprises the ROM 104 in which gaming program and data are stored in advance, the CPU 103 to carry out control operations according to the gaming program of the ROM 104 and the RAM 105 to offer a working area required for the control process.

A clock pulse generating circuit 106 and a frequency divider 107 to generate standard clock pulse, a random number generator 108 to generate random numbers to be sampled, and a sampling circuit 109 to sample random numbers based on signals from a start lever 26 to be described below are connected to the CPU 103. Random number sampling may be carried out in the microcomputer 102 by software processing. In that case, the random number generator 108 and the sampling circuit 109 may be omitted.

A control program to control various operations of a pachi-slot gaming machine, a prize probability table to be used for judging whether a random number obtained based on an operation of the start lever 26 is won or not, a stop table to determine the stopping position of reels 9L, 9C and 9R depending on the operations of stop button 27L, 27C and 27R, various gaming information commands to the sub-control circuit 201 in the probability lottery process described below are stored on ROM 104 of the microcomputer 102. Various peripheral devices (actuator) are connected to the CPU 103 via I/O port 110.

A motor driving circuit 111 controls stepping motors 112L, 112C and 112R to rotate reels 9L, 9C and 9R respectively depending on driving signals from the CPU 103. Moreover, the motor driving circuit 111 controls to stop the stepping motors 112L, 112C and 112R according to the stop control signal from the CPU 103.

The hopper driving circuit 113 controls drive of a hopper 114 as a coin payout device based on the payout command from the CPU 103.

The seven-segment driving circuit 115 controls driving of various display part (payout display part 13, credit display part 25, in-bonus display part 11) configured with the seven-segment LED.

The lamp driving circuit 116 controls driving of various display parts (1-BET lamp 10*a*, 2-BET lamp 10*b*, MAXBET (3-BET) lamp 10*c*, WIN lamp 12) configured with lamps. Lighting of the WIN lamp 12 is configured in such a manner that it cannot be seen from the outside of the gaming apparatus.

There are other display devices such as liquid crystal display device 14 and reel backlight to be described below. The drive of them is controlled with the sub-control circuit 201.

Major input signal generation means of the microcomputer 102 to generate control signals required for input signals to each driving circuit includes a start lever 26, the 1-BET switch 16, the 2-BET switch 17, the MAXBET switch 18, the C/P switch 22, an inlet coin sensor 117, a reel stop signals circuit 118, a reel index detection circuit 122, a payout detection circuit 119. They are also connected to the CPU 103 via I/O port 110.

The start lever 26 detects a start operation by a player. The inlet coin sensor 117 detects coins that were inlet from the coin slot 28 and passed through a selector to screen irregular coins. The reel stop signals circuit 118 generates stop signals by detecting each stop button 9L, 9C and 9R are operated. The reel index detection circuit 122 supplies the CPU 103 with symbol position reset signals by receiving signals from a rotation reference position detection switch in a stepping motor. The payout detection circuit 119 supplies the CPU 103 with payout number signals by receiving signals from a coin detection part 120 in the hopper 114.

The method to control each driving circuit in the flow of a series of a game will be explained now. At first, the random number generator 108 generates random numbers in a certain numerical range since a power switch of the pachi-slot gaming machine 1 is turned on. If the inlet coin sensor 117 detects coin inlet by a player or coins are credited, the 1-BET lamp 10*a*, the 2-BET lamp 10*b* and the 3-BET lamp 10*c* are driven by the lamp driving circuit 116 to light up depending on the bet operations of the 1-BET switch 16, the 2-BET switch 17 and the MAXBET switch 18. When the start lever 26 detects a gaming start operation by a player, the sampling circuit 109 starts sampling of a random number value. The sampled random number value and the prize probability table stored on the ROM 104 are cross-checked. If it is won, a winning flag for the related prize pattern becomes on. Such lottery process on the basis of software is called "probability lottery process". Details are to be described below.

Drive pulses are supplied to each stepping motor 112L, 112C and 112R via the motor driving circuit 111 and each of reels of 9L, 9C and 9R starts rotating. The CPU 103 monitors drive pulses supplied and updates a "pulse counter" secured in the RAM 105. The pulse counter value is monitored, and if it becomes a predetermined value, a symbol is considered to move by one symbol (also referred to as "one frame"), and the "symbol counter" secured in the RAM 105 is counted up by one count.

For example, if a stepping motor performs one rotation at 1-2 phase excitation 400 pulse and 21 symbols are arranged on an outer peripheral surface of a reel, since a symbol moves by one frame by about 19 pulses, the CPU 103 judges a symbol moved by one frame and counts up the "symbol counter" by one count.

On the other hand, in reels 9L, 9C and 9R, each time when the reference point of a symbol passes the center line L1 of the display window 8, an index detection signal is generated and a reset pulse is input to the CPU 103 through the reel index detection circuit 122. The CPU 103 that detected the input of the reset pulse, clears the symbol counter that is counted up with the RAM 105. Consistency between a symbol position recognized on a software basis and the one actually displayed in the display window 8 is ensured.

When the reels 9L, 9C and 9R go into a constant speed rotation state after a given length of time has passed since they started rotating, the operation of the stop buttons 27L, 27C and 27R are enabled. When a player carries out a stop operation, a reel stop signal is inputted to the CPU 103 via the reel stop signals circuit 118. After a processing on a software basis such as selection of a stop position, a stop pulse is supplied to the stepping motor 112L, 112C and 112R via the motor driving circuit 111 and reels 9L, 9C and 9R are controlled to stop.

In carrying out the stop control of the reels 9L, 9C and 9R, the CPU 103 stores a code number of a symbol on the center line L1 as a stop operation position on a predetermined area of the RAM 105 when a stop signal from the reel stop signal circuit 118, refers to a stop table that associates the stop operation position with the center line L1. Then the CPU 103 stores a symbol stop position corresponding to a stop operation position in a predetermined area of the RAM 105, calculates the number of pulses (frames) to be supplied to stop an intended symbol, and carries out a stop control after supplying pulses of a calculated number.

If the reels 9L, 9C and 9R are all stopped, a prize search is carries out. In a prize search, a symbol table stored on the ROM 104 and a symbol stop position stored on the RAM 105 are cross-checked with each other, and a stop mode of a current game stopped in the display window 8L, 8C and 8 R is provided. A symbol table is configured corresponding to a symbol column painted on a outer peripheral surface of the reels 9L, 9C and 9R to associate a code number indicating an order of a symbol from a reference position with a symbol code provided corresponding to the code number and play a role of a reel band on a software basis. Then, for each effective line L1, L2A, L2B, L3A and L3B, the stop mode and a prize symbol combination table stored on the ROM 104 are cross-checked with each other to judge existence of a prize. A prize symbol combination table relates a prize symbol combination to the number of dividend coins in prize. The prize symbol is switched in order to change a prize symbol combination or dividend coin number depending on a gaming state.

The CPU 103 pays out predetermined number of coins from the hopper 114 by supplying a payout signal to the hopper driving circuit 113 if "prize" is judged in a prize search. At that time, the coin detection part 123 calculates the number of coins that are paid out from the hopper 114 and stops the driving signal to the hopper driving circuit and a payout of coins if the calculated number reaches a predetermined number.

Figure 3:
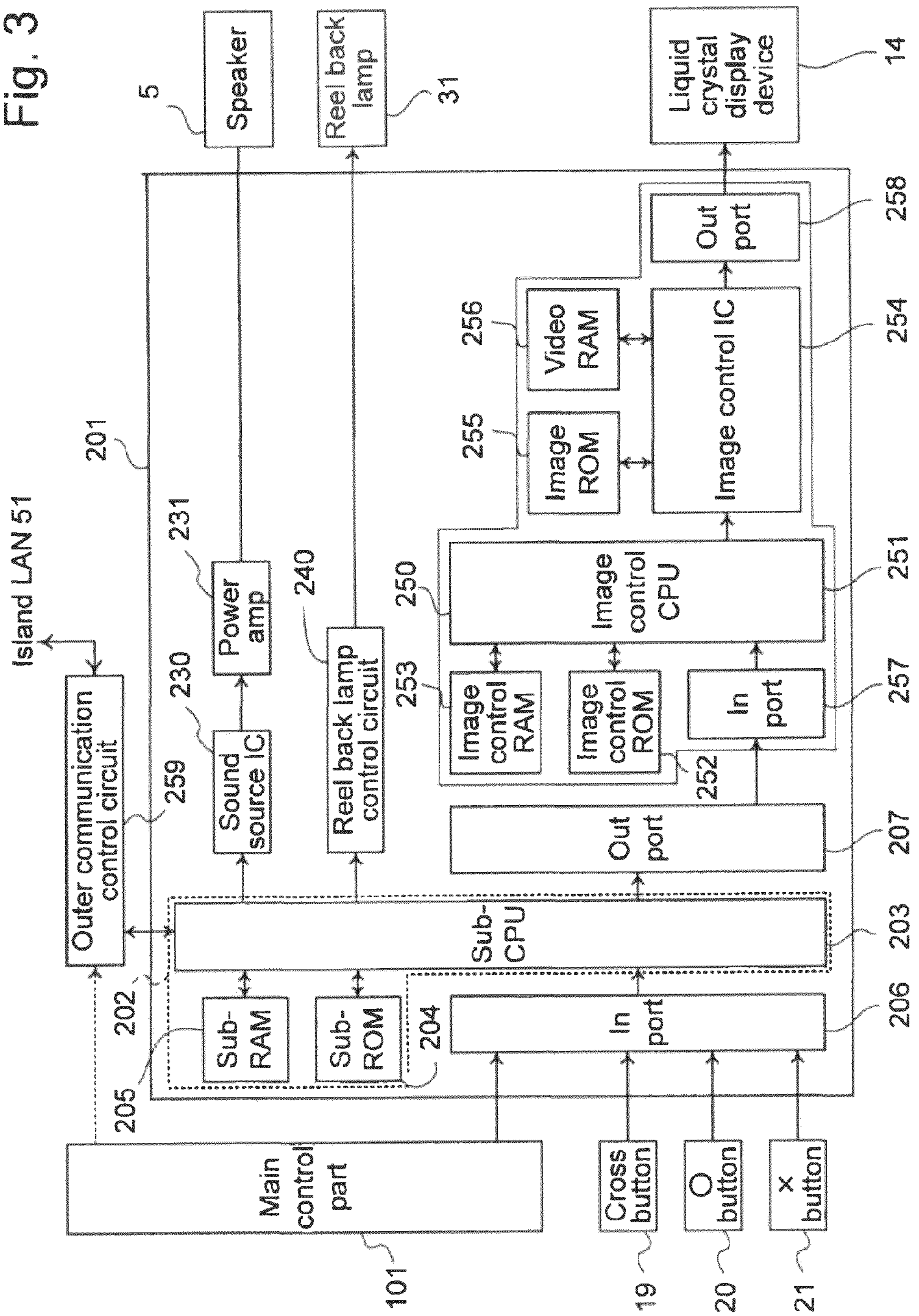
FIG. 3 is a block diagram showing a sub-control circuit.

The block diagram in FIG. 3 shows a configuration of a sub-control circuit 201. The sub-control circuit 201 controls peripheral devices for attraction such as the liquid crystal display device 14, speaker 5L and 5R based on gaming information from the main control circuit 101, and inputs from the cross button 19, determination button 20 and cancel button 21.

This sub-control circuit 201 is configured with a sub-microcomputer as a main component, image control circuit 250 to control the liquid crystal display device 14, sound source IC 230 to control sound from the speaker 5L and 5R, power amp 231 as an amplifier, and reel back lamp control circuit 240. These control circuits are configured with other circuit boards than the main control circuit.

The sub-microcomputer 202 comprises the sub-CPU 203, the sub-ROM 204 as a saving means and sub-RAM 205. The sub-control circuit 201 shown in FIG. 3 comprises a clock pulse generating circuit, frequency divider, random number generator, sampling circuit as the main control circuit though they are not shown. The sub-ROM 204 stores a communication sequence program with the main control circuit 101, an attraction selection table to select various attractions based on received gaming information and sound sequence program. The sub-RAM 205 is used as a working area to carry out these control programs.

The sub-CPU 203 determines an attraction to be carried out by various attraction control circuits based on a gaming information command sent from the main control circuit 101 and sends the determined contents to each attraction control circuit.

The image control circuit 250 is configured with an image control the CPU 251, an image control ROM 252, an image control RAM 253, an image ROM 255, a video RAM 256 and an image control IC 254. The image control CPU 251 receives a parameter determined by the sub-microcomputer 202 through the image control circuit IN port 257, and determines the display contents on the liquid crystal display device 14 in accordance with the image control sequence program stored on image control ROM 252. The image control ROM 252 stores a receipt sequence program of an image attraction command sent from the sub-microcomputer 202, image control sequence program to control the image control IC 254. The image control RAM 253 is used as a working area when carrying out an image control program.

The image control IC 254 forms images corresponding to display contents determined by the image control CPU 251 using graphic data stored on the image ROM 255, stores them on the video RAM 256 temporarily, outputs them on the liquid crystal display device 14 in time via the image control circuit OUT port 258 to carry out display attractions.

The outer communication control circuit 259 outputs lighting information of the WIN lamp 12 controlled by the main control circuit 101 via lamp driving circuit 116 and gaming information sent from the sub-CPU through island LAN to be described below.

Figure 5:
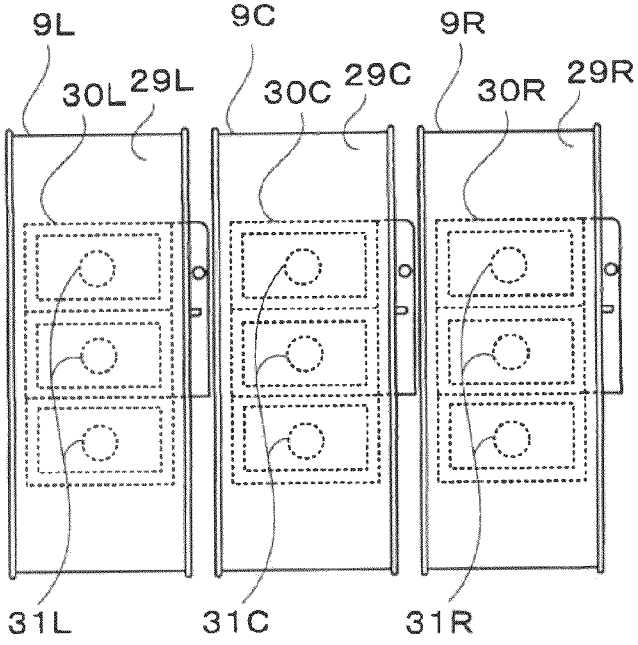
FIG. 5 is a diagram showing a reel and back lamp.

The reel back lamp control circuit 240 is used for attraction display control such as prize attraction and winning flag announcement. FIG. 5 is an enlarged drawing of the reels 9L, 9C and 9R. The reel bands 29L, 29C and 29R of the reels 9L, 9C and 9R are configured with a semi-translucent film material, symbols such as "cherry", "7" are printed on the surface with light transmittance inks. Regions other than the symbols are masked with light shielding inks. At The back of the reel bands 29L, 29C and 29R, lamp housings 30L, 30C and 30R are provided so that lighting of each lamp may not interfere with other symbol regions. The reel back lamps 31L, 31C and 31R are contained in each chamber of the lamp housings 30L, 30C and 30R. The reel back lamp control circuit 240 controls blinking of reel back lamps 31L, 31C and 31R based on a parameter determined by sub-microcomputer 202. It suggests a player of a prize symbol to be aimed, for example, by controlling blinking of reel back lamps 31L, 31C and 31R on the prize line when coins are paid out or preparing different blinking modes by internal prize pattern and executing an attraction display when a winning flag is established.

FIG. 6 is a drawing in which the reel bands 29L, 29C and 29R are developed out on the flat. Each reel has 21 symbols. Each symbol has a symbol number from 1 to 21. They are stored on the ROM 104 as a symbol table. The symbol columns 9L, 9C and 9R are varyingly displayed accompanying the rotation drive of the reels 9L, 9C and 9R. in the order of the symbol number (increasing order).

FIG. 7 shows dividend coin numbers for prize symbol combinations (prize pattern) in each gaming state.

Internal winning, prize and gaming state will be explained now. Internal winning is a state wherein a winning is judged by cross-checking a sampled random number value and a prize probability table, and a winning flag of a related prize pattern is on in aforementioned probability lottery process. In general, a winning flag exists for all prize patterns. However, it is effective only established games. Winning flags are roughly categorized into a so-called small prize pattern with a comparatively smaller payout number wherein an winning flag is not carried over to the next game and a so-called bonus pattern wherein a winning flag is carried over until an prize is generated and internal lottery probability of prize patterns such as a big bonus (BB) or regular bonus (RB) is raised, and a large number of coin payout can be obtained.

Small prize patterns include, for example, "cherry" prize pattern that is won only by stopping on the effective line of the left reel, "bell" prize pattern or "watermelon" prize pattern that is on when three symbols stop on the effective line. Bonus prize patterns include a big bonus and regular bonus. The regular bonus (RB) is generated, for example, "BAR-BAR-BAR" is aligned on an effective winning line and pays out 15 coins in a prize. It continues until a bonus game (of one coin bet called JAC game or pattern gaming) is played 12 times or prize is generated eight times. A big bonus (BB) is generated when, for example, "red 7-red 7-red 7" are aligned on the effective line. It pays out 15 coins when prize. During a big bonus, small prize patterns such as so-called general gaming, and gaming with the prize probability of RB increased can be played up to 30 times. During the game, RB can be played up to three times. An RB prize from a general gaming is generated when, for example, "BAR-BAR-BAR" is aligned. A RB prize from a general gaming during BB is generated when "Replay-Replay-Replay" are aligned. When a replay prize pattern is won, the same number of coins as inlet coins is inserted automatically. Therefore, a player can play a game without inserting coins in the next game. A single bonus (SB) is generated when, for example, "7 with sword-with sword-7 with sword" are aligned on the effective line. It pays out 15 coins when it is won. JAC game can be carries out once. Though the SB has a name of "bonus", a winning flag is not carried over. The winning flag is effective only in the current game as a small prize pattern.

Gaming states will be explained now. The gaming states can be roughly categorized into three states depending on existence of a winning flag of bonus prize pattern, including the general gaming state wherein no bonus pattern has been won even in an internal lottery, the bonus internal winning state wherein, though there has been an internal winning in a probability lottery process, no prize has been generated with no bonus winning symbol aligned on the effective line (also referred to as "internally won bonus" or "internally hit bonus"), and bonus gaming state wherein prize symbols have been aligned on the effective line during bonus internal winning and a bonus gaming is played (also referred to as "enabled bonus")

Further, the internally won bonus is categorized into internally won BB and internally won RB depending on the bonus categories. Enabled bonus is categorized into enabled BB and enabled RB.

There are gaming states that are advantageous for a player to obtain a large number of coins other than bonus prize pattern.

For example, a specific state is known in which a high probability table (for example SB internal winning probability 1/2) and low probability table (for example SB internal winning probability 1/20) are prepared for a prize probability table of SB during the general gaming, so-called "concentrated apparatus". Then a lottery to switch to a high probability table is carried out when using a low probability table (referred to as "plunge lottery"), on the contrary, a lottery to switch to a low probability table is carried out when a high probability table used (generally referred to as "puncture lottery"), and coins increase gradually.

In addition, a specific state called "AT (assist time) function" is known. In the specific state, multiple prize patterns that can never be won at the same time are set (for example, prize patterns such as "bell-bell-red 7", "bell-bell-blue 7" and "bell-bell-white 7" are provided, with four frames or over interval of symbols such as "red 7", "blue 7" and "white 7" on the right reel). In a normal state, categories of internal prize pattern are not informed, so which "7" to be aimed is unknown, theoretically, prize 1/3 is only possible after the internal winning. However, in the state to inform internal winning categories called "AT period", categories of "7" symbol to be aimed is known, theoretically, prize is possible at 100% after the internal winning only if aiming is correct, and the coins increase gradually.

There is an "ST (super-time) function" in which a stop control is carries out with no prize pattern aligned unless predetermined stop order is carried out against the internal prize pattern of 1 even if a prize pattern is internally won and precise frame press is performed. For example, as shown in FIG. 8, 6 types of stop order table from "NO. 1" to "No. 6" are prepared, when a bell is internally won in a probability lottery process, a stop table to be used is selected with a random number lottery and so on. For example, in a current game, if a table stop table "No. 3" is selected, an winning is generated when middle stop button 27C, left stop button 27L and right reel stop button 27R are pressed in the first, second and third stop operation, respectively. For other 5 types of stop order, a stop control wherein bell symbols are not aligned on the effective line even if a bell is internally won is carried out.

In a normal state, since this stop order is not informed, theoretically, prize is restricted to 1/6 after an internal winning. However, a state called ST period in which categories of a selected stop table is informed is known. In other words, when attaining the state in which an order to be stopped should be informed, theoretically, it is known that the 100% winning is possible after internal winning and coins gradually increase.

As shown in FIG. 7, the dividend coin number is different depending on gaming states even if a prize symbol is the same. For example, watermelon prize pattern has a payout of three coins during a general gaming and internally won bonus. However, it has a payout of 15 coins in general gaming during BB. "Replay-replay-replay" is a replay prize symbol during general gaming and internally won bonus. However, it is RB prize symbol in a general gaming during BB. It is prize-pattern prize symbol of 15 payout in the JAC game.

Further, in this embodiment, aforementioned "ST" is adopted as an advantageous status for a player other than bonus prize pattern. The ST gaming is configured in such a manner that it is activated if predetermined conditions are fulfilled during a general gaming. Specifically, when the SB prize pattern or the bell prize pattern is won internally, information about stop order required for aligning combination of symbols to be won in each prize pattern is announced to a player. Therefore, when the SB prize pattern or bell prize pattern is internally won during the period of this specific state, a player can surely generate winning without generating a failure by operation in accordance with the stop order announced.

FIG. 9 is a diagram showing a prize probability table used in aforementioned probability lottery process. A random number value is extracted in the range of "0 to 16383". If it belongs to a winning range specified to each prize pattern, a related prize pattern wins an internal winning. For example, a random number value extracted in a current game is "10000", since it belongs to the winning range "2299" to "11024" of the bell prize pattern, the bell prize pattern is won internally. If a random number value extracted in a current game is "15000", since it belongs to the range of loss "13669 to 16383", no prize pattern is won internally resulting in loss.

FIG. 10 is a diagram showing a table of gaming information command from the main control circuit 101. In this embodiment, the main control circuit 101 to control prize judge and coin payout and the sub-control circuit 201 to control liquid crystal display device 14 and speaker 5L and 5R are configured with separate boards. Since gaming information about internal winning states of prize patterns and reel stop statuses processed in the main control circuit are required for a prize attraction processed by the sub-control circuit 201 and attraction control of a particular game, so-called battle rush (BR), both boards are connected to each other with a straight cable to sequentially send required information. Sent commands include "start command" sent when a player operates the start lever 26, "reel stop command" sent when operating stop button 27L, 27C and 27R to stop rotating reels 9L, 9C and 9R, "1 gaming completion command" sent when one gaming is fully completed. Each command denotes a type of data in 2 bites. An anticipatory bite denotes the type and succeeding bite denotes the contents of the command. A start command is configured with six bites data. Data types include four types including "internal winning pattern", "gaming state", "selected stop table" and "inlet coin number". The reel stop command for one time stop operation is configured with four bite data. Data types include two types including "stop order" and "stop reel". The one gaming completion command is configured with four bite data. Data types include two types including "prize categories" and "bonus gaming state".

FIG. 11 is a diagram showing major working area of the sub-RAM 205. A reception flag is a storage region of the gaming information command sent from the main control circuit 101. The BR continuance time number counter is a counter to show the number of the remaining games of BR, which is a particular game. A BR flag is a flag to identify BR generated by a winning of BR generation lottery process and BR currently generated. BR evacuation flag is a flag to identify that a bonus is internally won during BR and BR is interrupted. The random number for the attraction lottery process is a storage region for random numbers used for various lottery processes.

Figure 12:
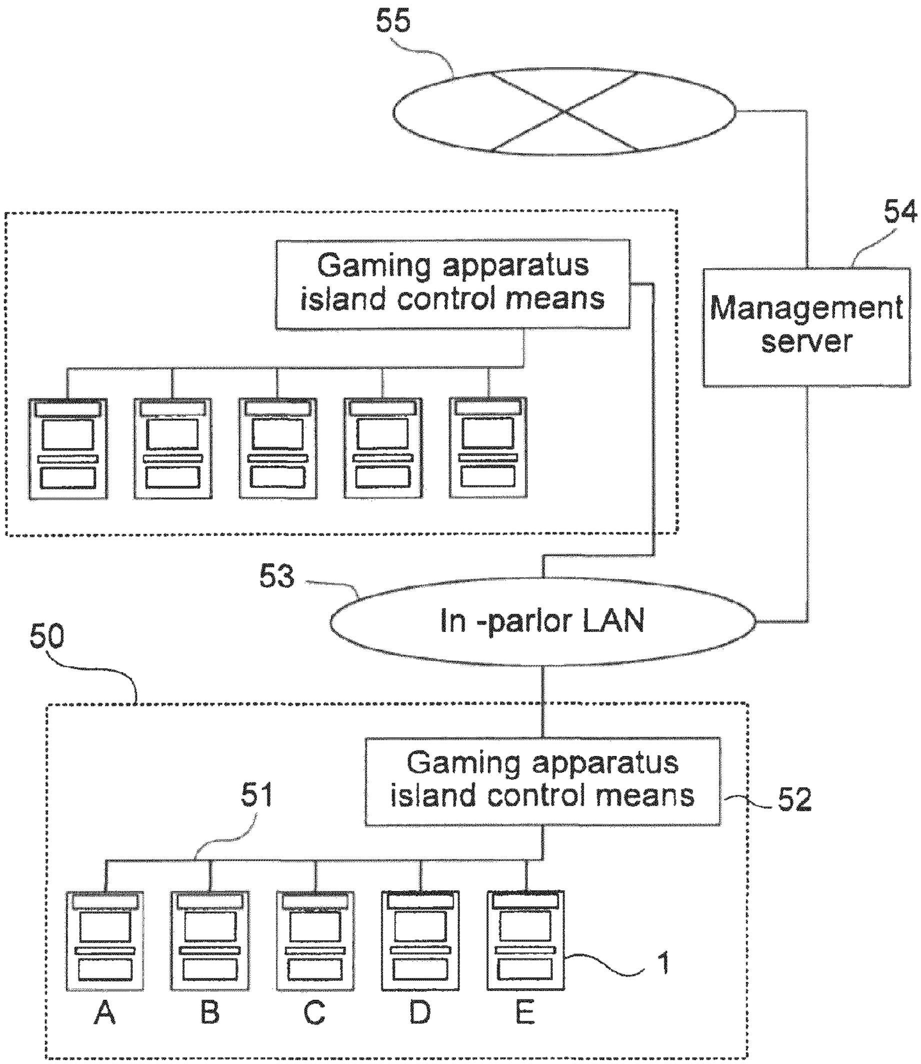
FIG. 12 is a diagram showing a system configuration of a link attraction.

FIG. 12 is a diagram showing a link attraction system. The pachi-slot gaming machine 1 installed in pachinko parlors or game parlors (hereinafter abbreviated to be "parlors") forms a gaming apparatus island 50 consisted of 5 to 20 units of gaming apparatuses. A system of supply and collection of gaming media for each gaming apparatus is configured with a unit of the island. Each pachi-slot gaming machine 1 is provided with an outer communication control circuit 259 as a means to connect to outer networks, which collect gaming information and WIN lamp operation information output from the main control circuit 101 and sub-control circuit 201 in the gaming apparatus island control means 52, which executes control and management of the communication sequence with a unit of the island, through island LAN (Local Area Network) 51 and sends them to the management server 54. The management server 54 is connected to Internet 55 and configured in such a manner that it can send and receive data from servers outside the parlor.

The management server 54 determines gaming apparatus unit (unit number) to send the current attraction mode and link attraction mode by a link attraction determination means to be described hereinafter configured with link attraction mode lottery table, and sends attraction information to gaming apparatus island control means as a sending destination. The gaming apparatus island 50 is configured with pachi-slot gaming machine 1 allotted with unit numbers from A to E and a gaming information display device to be hereinafter described. The gaming apparatus unit determined as the sending destination of the link attraction is identified by this unit number information. The gaming apparatus island control means 52 analyzes received data and send attraction data to each gaming information display device 80.

Figure 13:
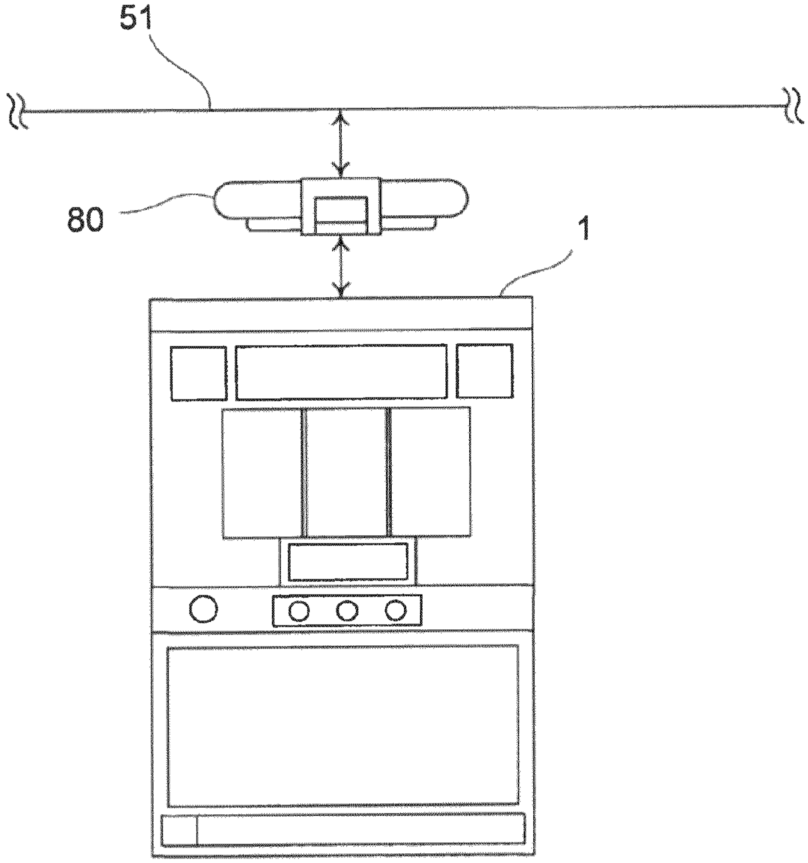
FIG. 13 is a diagram showing a positional relationship between a pachi-slot gaming machine and a gaming information display device.

FIG. 13 is a diagram showing positional relationship between pachi-slot gaming machine 1 and, gaming information display device 80. In general pachinko parlors, a gaming information display device 80 is installed corresponding to each gaming apparatus as a standard for selection of a gaming apparatus, showing number of big prizes and carried out games. In general, a gaming information display device 80 is installed at the upper part of the pachi-slot gaming machine 1. The gaming information corresponding to a gaming apparatus is sequentially displayed and updated. The gaming information display device 80 is connected to the management server 54 through the island LAN 51 to relay gaming information from the pachi-slot gaming machine 1.

Figure 14:
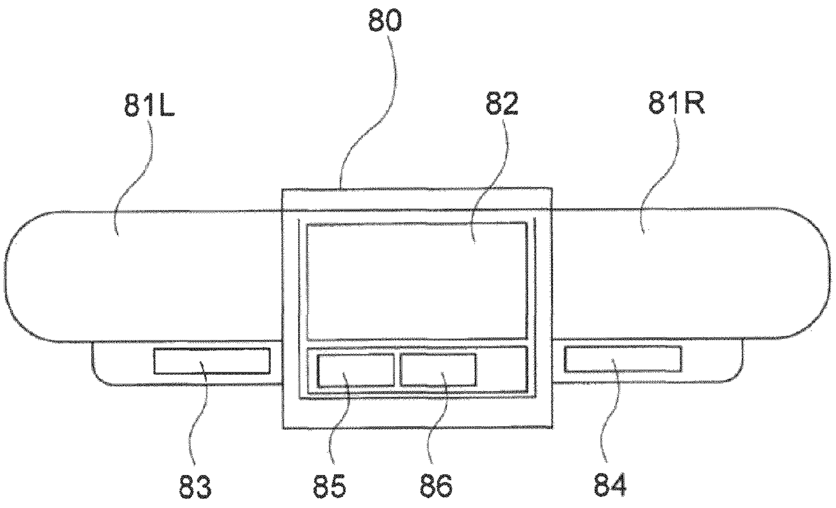
FIG. 14 is a front view of a gaming information display device.

FIG. 14 is an external view of the gaming information display device 80. The gaming information display device 80 is configured with a lamp display part 81L, 81R including a lamp board with a lamp board covered with a transparent acrylic cover, and a information display part 82 constituted of a liquid crystal display device. At the lower part of the lamp display part 81L and 81R, there are provided a call button 83 to call shop assistants in case of requiring calling assistants such as coin clogging or hopper empty generating, to make lamp display part 81L, 81R blink in the mode of calling, and a switching button 84 to switch gaming information displayed on the information display part 82 to the past records. Calling button 83 lights up in the calling blinking mode by pressing once. It stops blinking by pressing once again.

Under the information display part 82, a left scroll button 85 to left-scroll the display contents to change and right-scroll button 86 to right-scroll to change display contents are provided.

Figure 15:
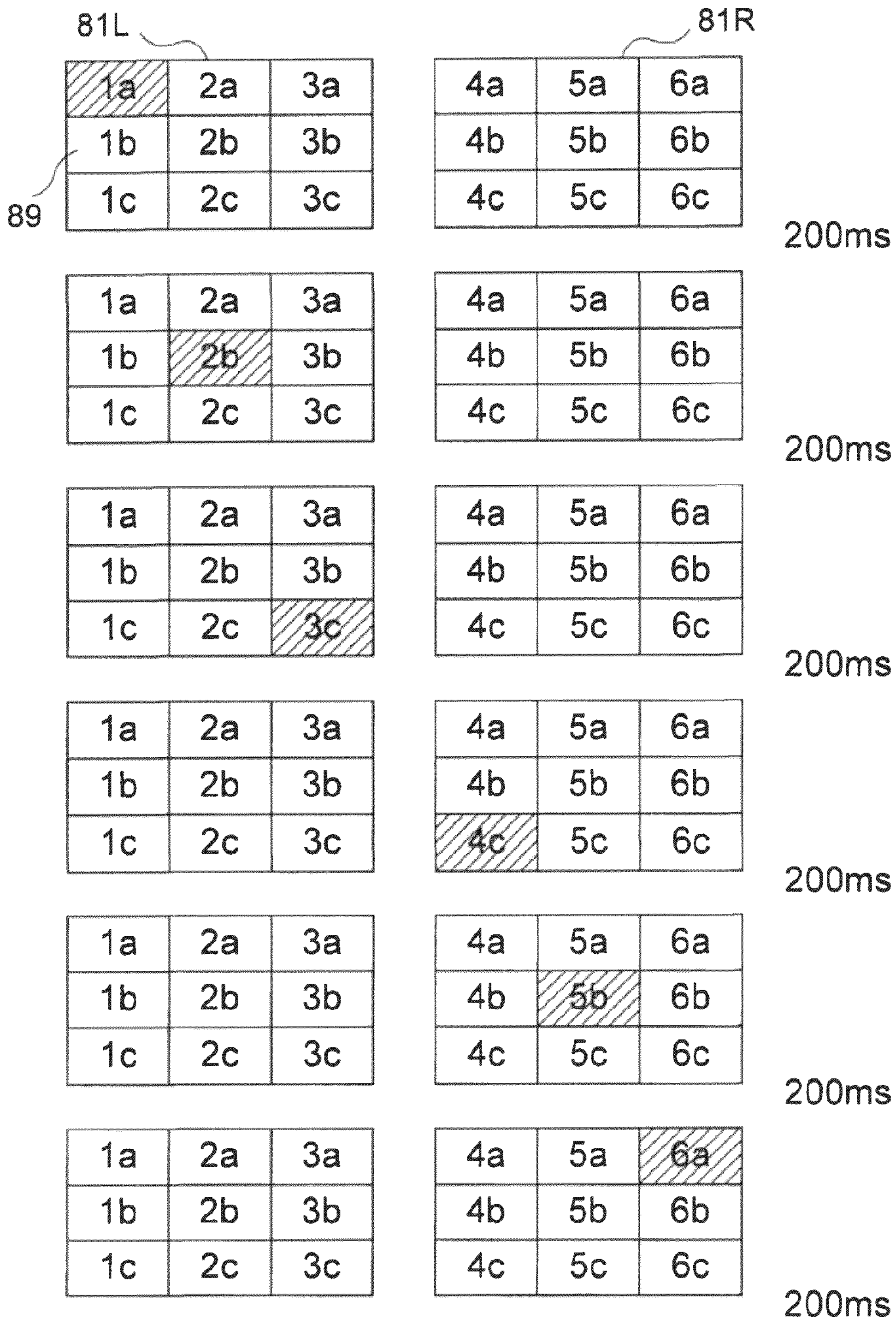
FIG. 15 shows an internal structure and patterns of a lamp display device in a lamp attraction mode (1).

FIG. 15 is a diagram showing an inner structure of the lamp display part 81L and 81R of the gaming information display device 80, and the lamp attraction mode (1) carried out by the lamp display part 81L and 81R. Nine lamps are provided in the lamp housing 89 sectioned by a light shield wall in the lamp display part 81L and 81R. Each lamp is installed on the lamp board 88L of the lamp display part 81L and lamp board 88R of the lamp display part 81R.

Shaded areas of the diagram represent the state of lighted lamps. Other parts denote light-off lamps. The numbers on the lower right represent displayed time. In the attraction mode of lamp attraction mode (1), first, the lamp 1*a* lights up for 200 ms in left upper row of the left side lamp display part 81L, then, lamp 2*b* lights up for 200 ms in middle row of the left side lamp display part 81L, then, the lamp 3*c* lights up for 200 ms in the right lower row of the left side lamp display part 81L, then the lamp 4*c* in left lower row of the right side lamp display part 81R, then, the lamp 5*b* lights up for 200 ms in the middle row of the right side lamp display part 81R, finally, the lamp 6*a* lights up for 200 ms in the upper right row of the right side lamp display part 81R to complete one attraction.

Figure 16:
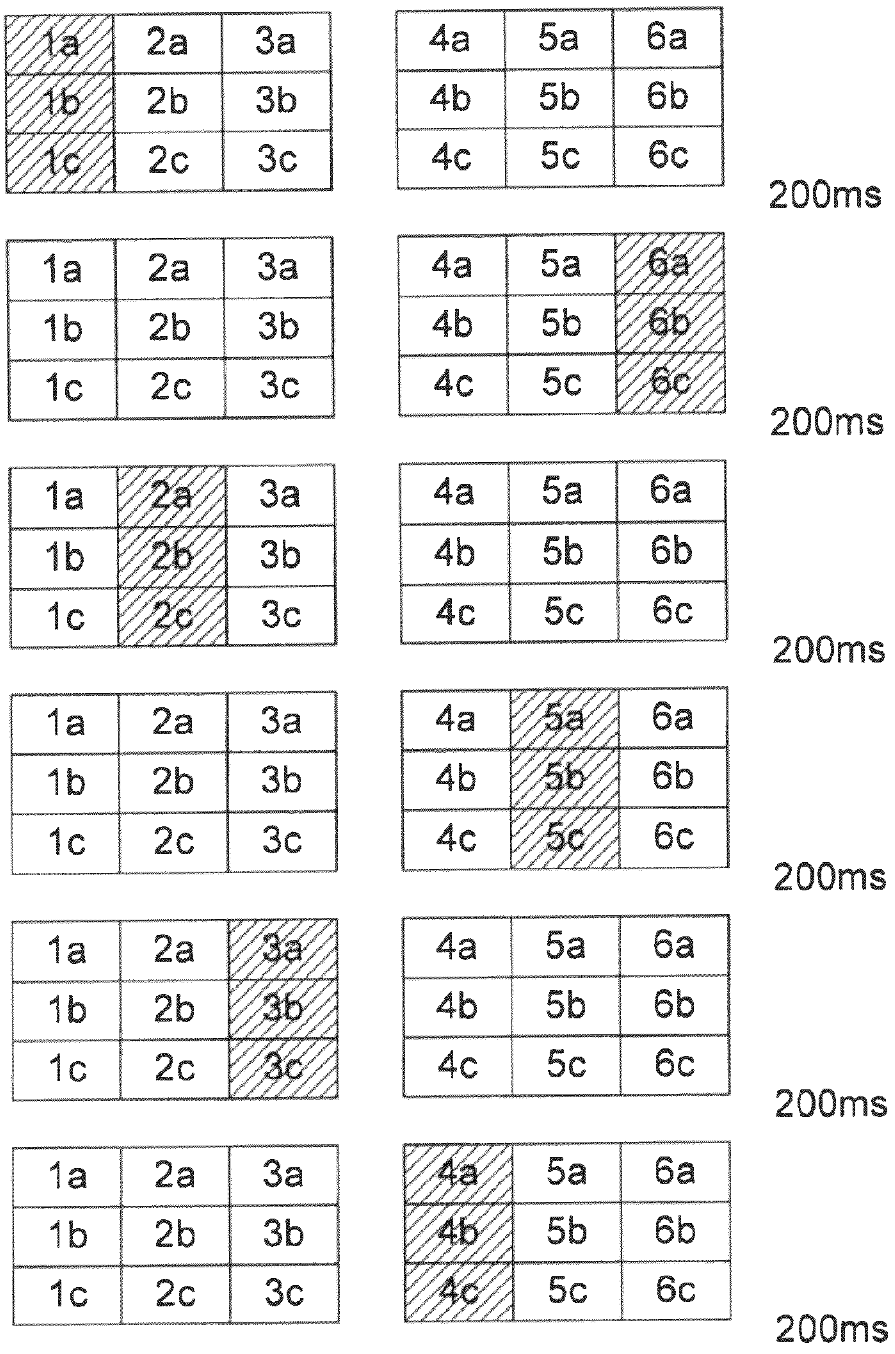
FIG. 16 shows patterns of a lamp display device in a lamp attraction mode (2).

FIG. 16 is a diagram showing the lamp attraction mode (2). First, lamps in the left upper row 1*a*, left middle row 1*b*, left lower row 1*c* of the left side lamp display part 81L light up for 200 ms, then lamps light up for 200 m in the right upper row 6*a*, right middle row 6*b* and right lower row 6*c* of the right side lamp display part 81Rs, then, lamps light up for 200 ms in the middle upper row 2*a*, middle row 2*b* and middle lower row 2*c* of the left side lamp display part 81L, then, lamps light up for 200 ms in the middle upper row 5*a*, middle row 5*b*, middle lower row 5*c* of the right side lamp display part 81R, then, lamps light up for 200 ms in the right upper row 3*a*, right middle row 3*b* and right lower row 3*c* of the left side lamp display part 81L, finally, lamps lights up for 200 ms in the left upper row 4*a*, left middle row 4*b* and left lower row 4*c* of the right side lamp display part 81R to complete one attraction.

Figure 17:
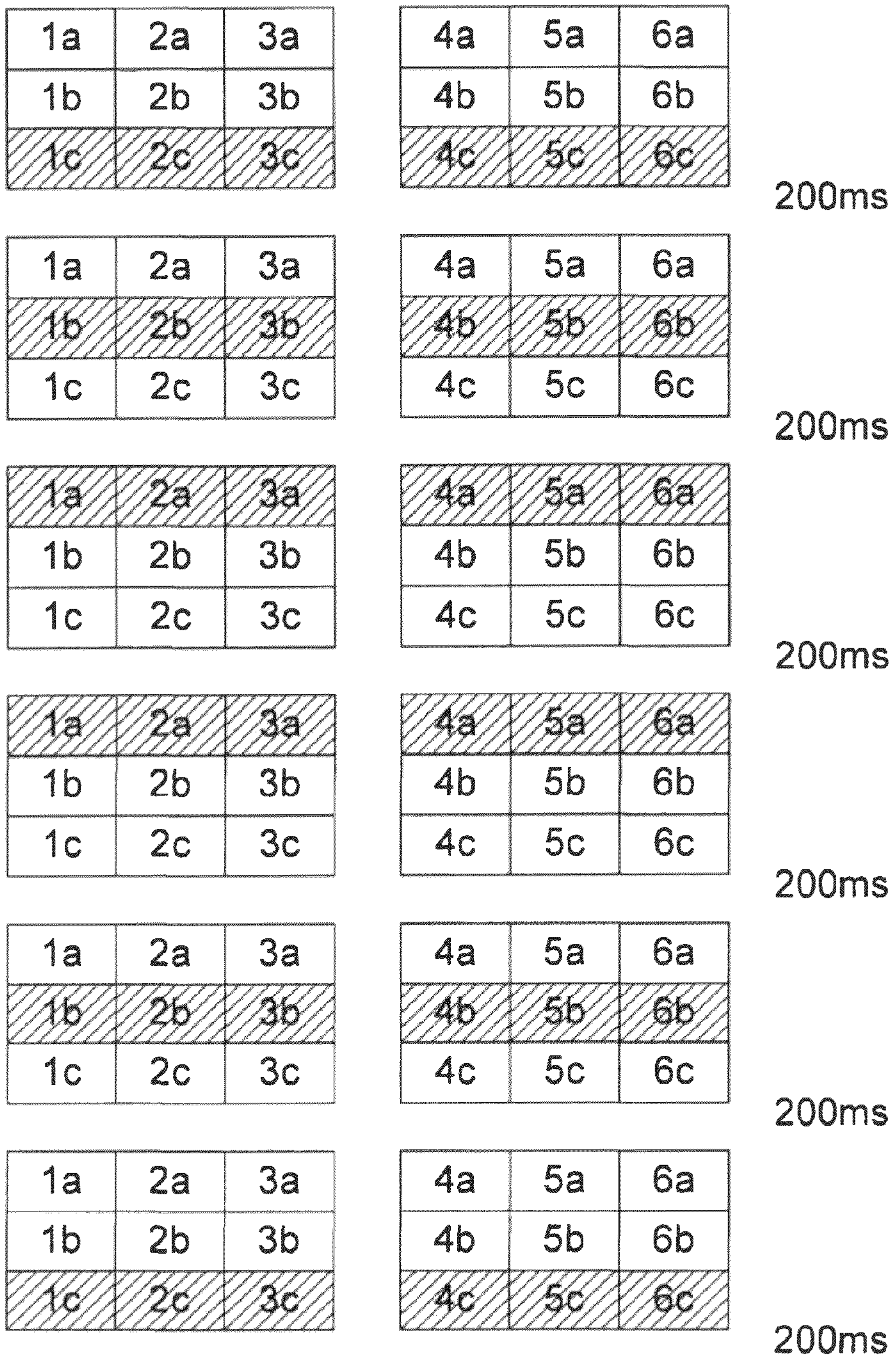
FIG. 17 shows patterns of a lamp display device in a lamp attraction mode (2).

FIG. 17 is a diagram showing lamp attraction mode (3). First, lamps in the left lower row 1*c*, middle lower row 2*c*, right lower row 3*c* of the left side lamp display part 81L and lamp in the left lower row 4*c*, middle lower row 5*c*, right lower row 6*c* of the right side lamp display part 81R light up for 200 ms, then, lamps in the left middle row 1*b*, middle row 2*b*, right middle row 3*b* of the left side lamp display part 81L, and lamps in the left middle row 4*b*, middle row 5*b*, right middle row 6*b* of the right side lamp display part 81R light up for 200 ms, then, lamps in the left upper row 1*a*, middle upper row 2*a*, right upper row 3*a* of the left side lamp display part 81L and lamps in the left upper row 4*a*, middle upper row 5*a*, right upper row 6*a* of the right side lamp display part 81R light up for 200 ms, then, lamps in the left upper row 1*a*, middle upper row 2*a*, right upper row 3*a* of the left side lamp display part 81L and lamps in the left upper row 4*a*, middle upper row 5*a*, right upper row 6*a* of the right side lamp display part 81R light up for 200 ms, then, lamps in the left middle row 1*b*, middle row 2*b*, right middle row 3*b* of the left side lamp display part 81L and the lamps in the left middle row 4*b*, middle row 5*b*, right middle row 6*b* of the right side lamp display part 81R light up for 200 ms, finally, lamps in the left lower row 1*c*, middle lower row 2*c* and right lower row 3*c* of the left side lamp display part 81L and Lamps in the left lower row 4*c*, middle lower row 5*c*, right lower row 6*c* of the right side lamp display part 81R light up for 200 ms to complete one attraction.

Figure 18:
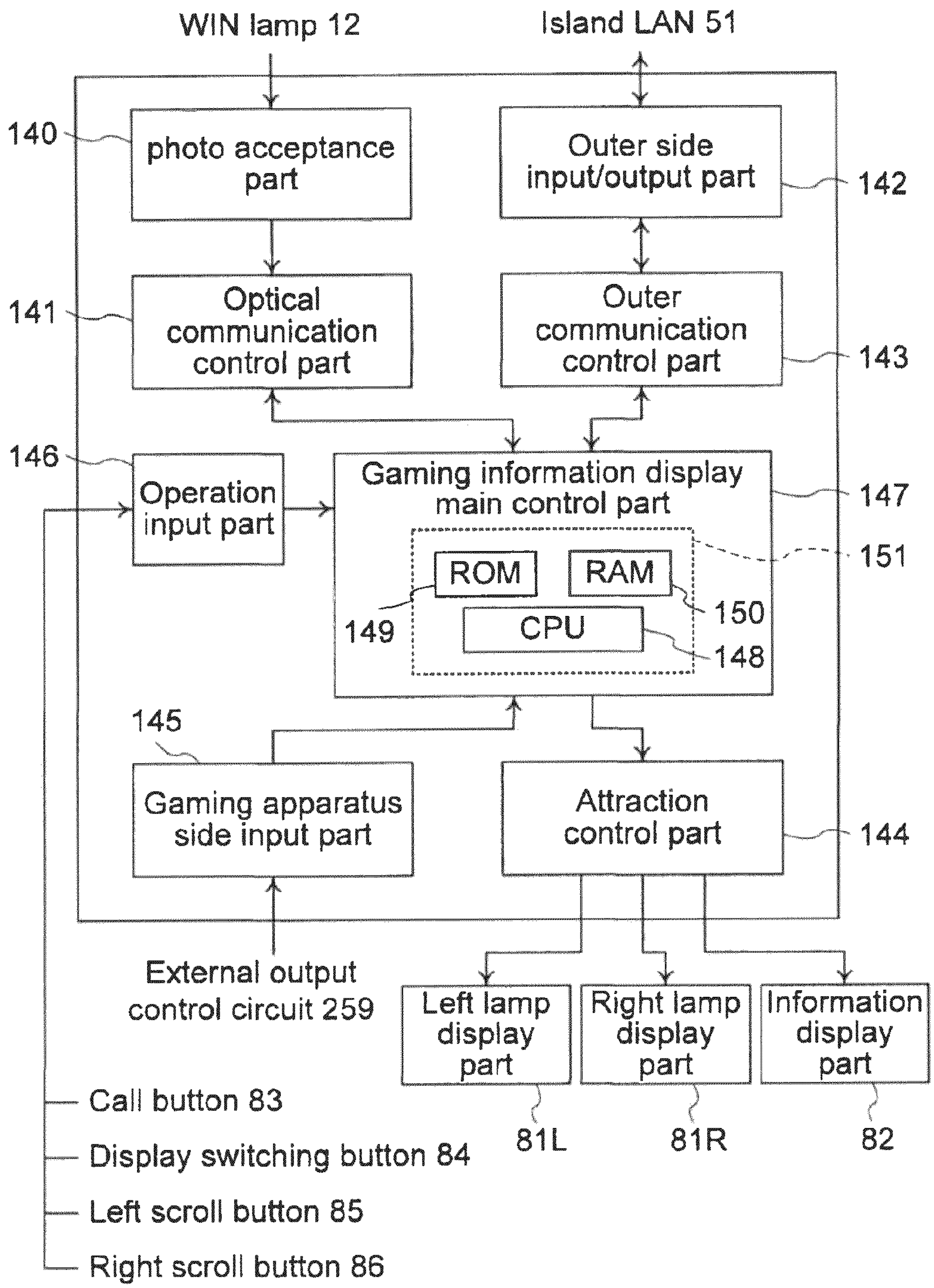
FIG. 18 is a control block diagram of a gaming information display device.

FIG. 18 is a block diagram of the gaming information display device 80. The gaming information display device is composed of an WIN lamp detection block to detect WIN lamp 12 to light up, an outer communication control block to control communication with the management server 54 via island LAN 51, an attraction control block to control attraction of lamp display part 81 and information display part 82 built in the main body of the gaming information display device 80, gaming apparatus communication block to control communication with pachi-slot gaming machine 1, operation detection block to detect inputs from various operation buttons, and gaming information display device main control block to totally control each block.

The WIN lamp detection block is composed of a photo acceptance part 140, installed near the WIN lamp, having a photo acceptance element to detect light generated by a lamp, and an optical communication control part 141 to send the detection signals from photo acceptance part 140 to the main control part via a filter circuit and an amplification circuit.

The outer communication control part 143 of the outer communication control part block is composed of an Ethernet (registered trademark) control part, (not shown), an IP control part to control Internet protocol, a TCP control part to control the transmission control protocol, and a DHCP client part to carry out client processing of dynamic host configuration protocol (DHCP) in order to carryout address assignment to each gaming information display device (gaming apparatus) and communication control by Internet protocol (TCP/IP) in the gaming apparatus island control means 52 described hereinafter.

The attraction control part 144 is provided with a function to control the lamp display part in a predetermined attraction mode when carrying out shop clerk calling operation or the link attraction mode is determined in the management server 54 and the like, a link attraction mode is determined and attraction data is sent via gaming apparatus island control means 52, and a function to display gaming information such as numbers of games and big prizes on the information display part 82.

The gaming apparatus side input part 145 processes gaming information received from an outer communication control circuit 259 of the pachi-slot gaming machine 1. Specific examples of gaming information include gaming history such as numbers of game and big prizes.

The operation input part 146 receives the input signals sent and relays the data to the gaming information display device main control part 147 when various input devices, calling button 83, display switching button 84, left scroll button 85, right scroll button 86 provided in the gaming information display device 80 are operated.

The gaming information display device main control part 147 comprises a gaming information display device microcomputer 151 composed of a gaming information display device CPU 148 (referred to as "gaming history CPU" hereinafter), gaming information display device ROM 149 (referred to as lower "gaming history CPU" hereinafter) and gaming information display device the RAM 150 (referred to as lower "gaming history CPU" hereinafter) and totally controls function blocks such as send and receive of the gaming information and attraction data, acceptance of operation of calling button 83 and scroll buttons 85 and 86.

Figure 19:
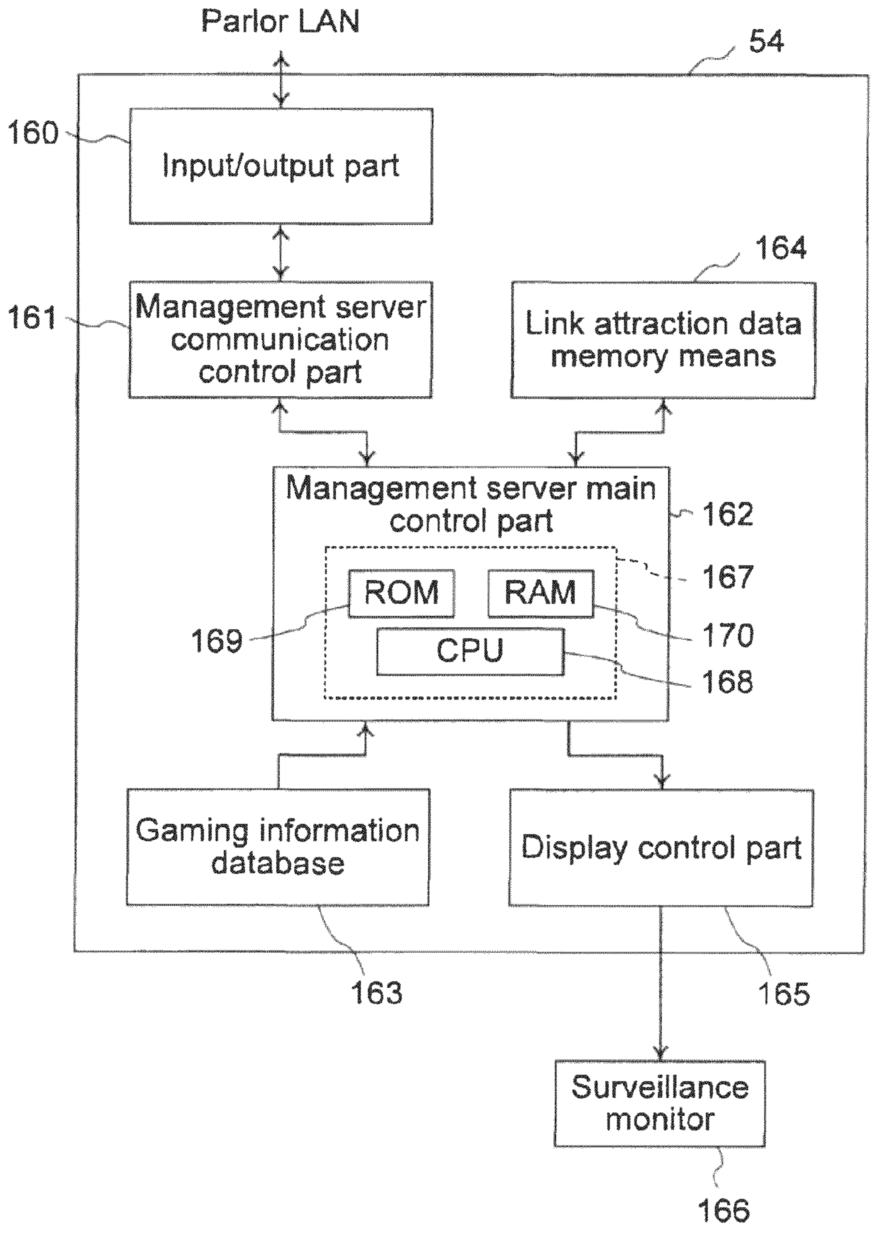
FIG. 19 is a control block diagram of a management server.
Figure 23:
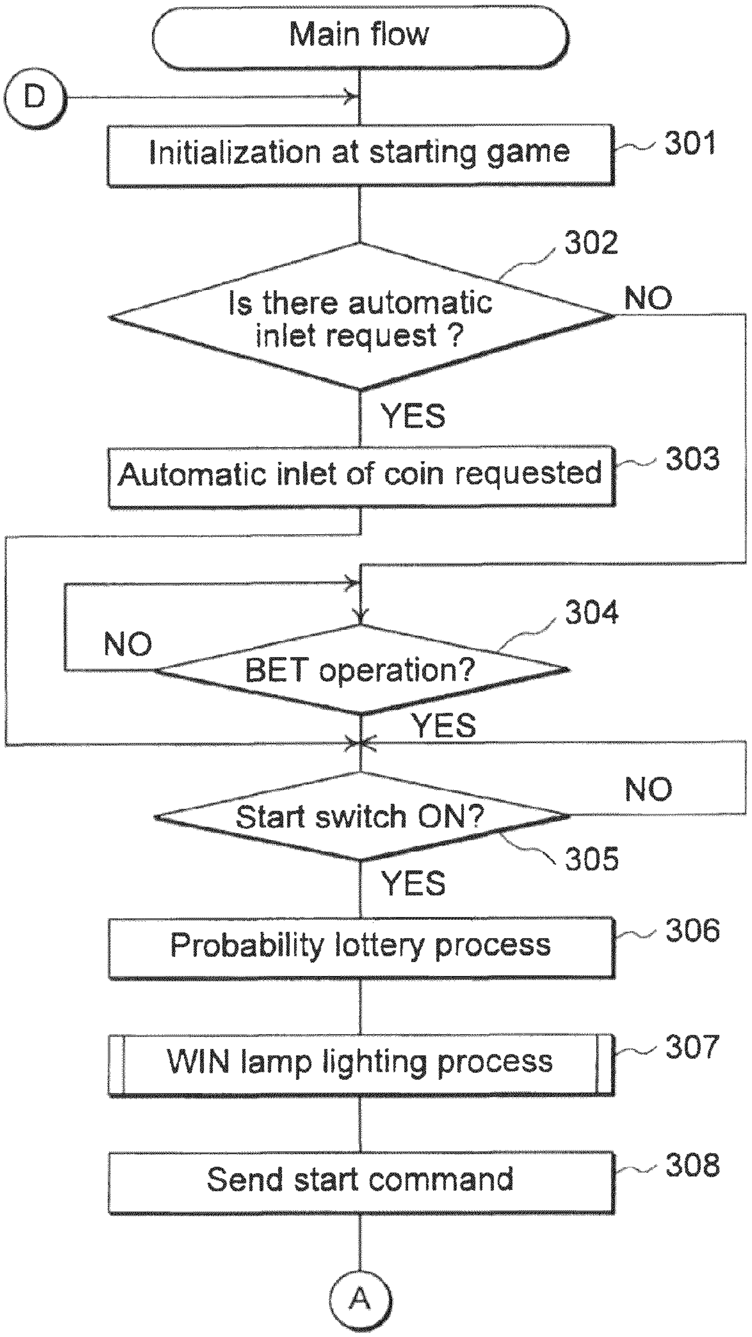
FIG. 23 is a flow chart showing a process of a main control circuit.
Figure 24:
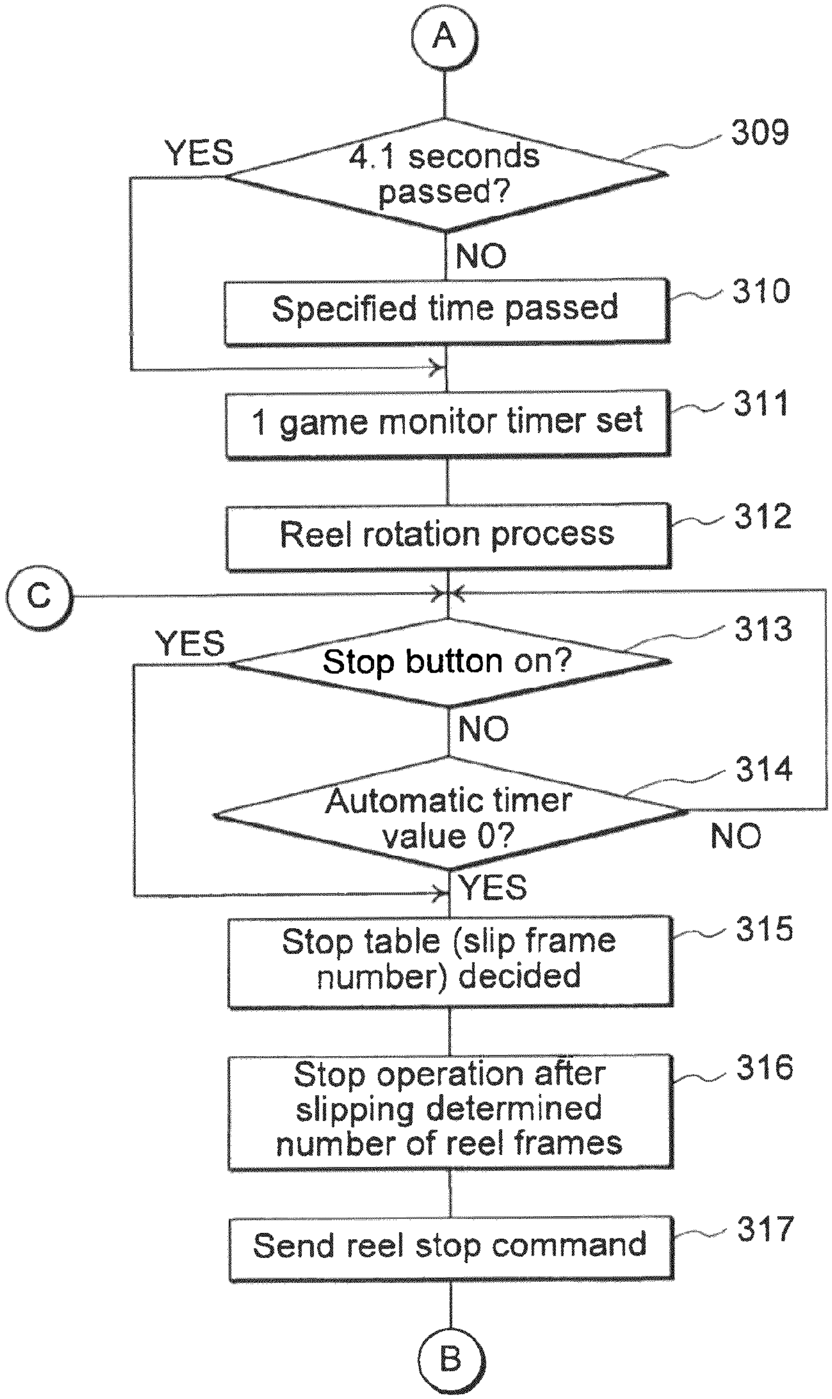
FIG. 24 is a flow chart showing a process of a main control circuit.
Figure 25:
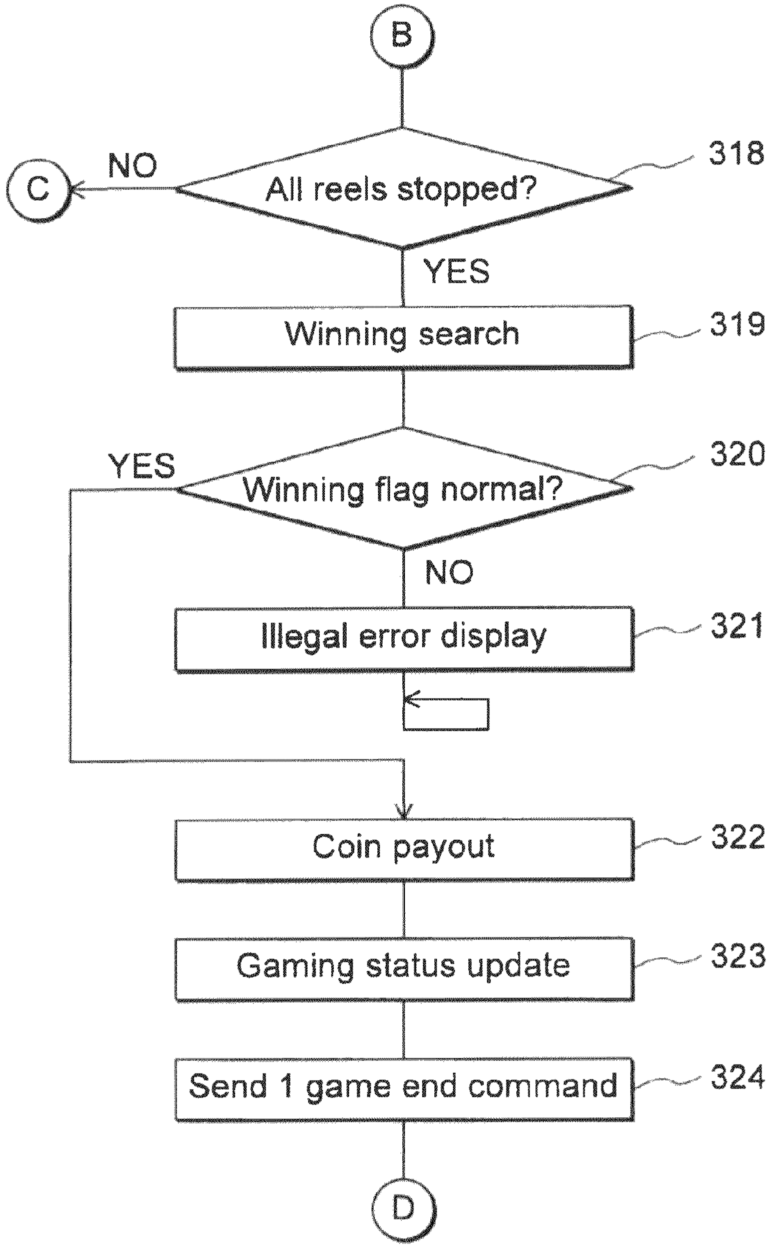
FIG. 25 is a flow chart showing a process of a main control circuit.

FIG. 19 shows a control block diagram of the management server 54. The management server 54 receives data sent from the LAN 53 in the parlor via input/output part 160 at the management server communication control part 161. Each one of the received transmission data is analyzed at the management server main control part 162. If it is a general gaming information, a link attraction mode is determined by referring to update of the gaming information database 163 used as business data and link attraction mode lottery table stored on a storing means 164 for the link attraction. If it is a WIN lamp lighting information, link attraction transmission destination (unit number) is determined and transmission processing of the attraction data is carried out referring to link attraction transmission destination lottery table stored on link attraction data stored on storing means 164. If it is a calling information or error information, a transmission processing of messages to prompt confirmation of related gaming unit to the portable communication terminal carried by parlor staffs is executed.

The display control part 165 displays various information on the monitor 166 in such a manner that manager can monitor the situation.

The management server main control part 162 is composed of a management microcomputer 167 composed of a management server CPU 168 (referred to as "management the CPU" hereinafter), management server ROM 169 (referred to as "management ROM") and management server the RAM 170 (referred to as "management RAM") and transmits or receives data and determines a lamp attraction mode based on a predetermined sequence program.

FIG. 20 is a diagram showing detailed data sent from the gaming information display device 80 to the management server based on the gaming information generated from the pachi-slot gaming machine 1. Transmitted data in common has information of a unit number of a sender gaming apparatus (unit). The transmitted data contains the game start information, coin inlet information, coin payout information, bonus prize generation information, bonus gaming completion information, bonus internal winning information, WIN lamp lighting information to identify WIN lamp lighting status, calling information generated by the operation of gaming information display device 80, error information generated when a misconduct is detected depending on gaming status FIG. 21 is a diagram showing a BR generation and BR continuance number lottery table. In this embodiment, whether a specific game BR is generated or not and the number of BR continuance are determined by lottery at a constant probability when a predetermined prize pattern is internally won.

In the table, BR is generated at the probability of 16/128 when a watermelon is internally won, 11/128 when two cherries internally won and 25/128 at loss.

FIG. 22 is a diagram showing a link attraction mode lottery table and link attraction transmission destination lottery table. In this embodiment, a link attraction determination process carried out in the management server 54 refers to it when the gaming information sent from each gaming apparatus includes bonus internal winning information, or WIN lamp lighting information.

Attraction transmission destinations are identified by unit number information A to E allotted to a pachi-slot gaming machine 1 and a gaming information display device accompanying to it.

The link lottery mode lottery table in FIG. 22(*a*) determines a attraction mode to be carried out from the three types of link attraction modes shown in FIGS. 15 to 17 depending on an established bonus prize pattern category and extracted random number if data sent from a gaming information display device is a bonus internal winning information and internal winning flag is on. The table is configured in such a manner that, if an internal prize pattern is BB, the probability that the attraction mode □ is selected is high, and if an internal prize pattern is RB, if the probability that attraction mode (1) is selected is high.

The link attraction transmission destination lottery table shown in FIG. 22(*b*) determines a gaming apparatus (unit) to transmit the link attraction carrying out data depending on transmitting gaming machine types and extracted random number if the data sent from gaming information display device is WIN lamp lighting information and WIN lamp lighting flag is on. It is highly probable that a gaming apparatus selected as a transmission destination is near an original gaming apparatus. For example if WIN lamp lighting up is generated in the gaming apparatus "C", the probability of being a transmission destination gaming apparatus decreases in the order of the gaming apparatus same as the source "C" (random number range: 64), the gaming apparatus "D" on the right of the transmission source gaming apparatus "C" (random number range: 28), and the gaming unit "B" on the left of the transmission source gaming apparatus "C" (random number range: 20) from highest to lowest.

In this configuration, it is possible to produce a sense of expectancy for bonus prize pattern also for players in the vicinity of the gaming apparatus executing the link attraction.

Then, control operation of the main control circuit 101 and the CPU 103 will be explained referring to the main flow chart from FIGS. 23 to 26.

At first, the CPU 103 carries out initialization before starting a game (step 301, referred to as ST hereinafter). Specifically, it carries out clearance of previous game status and communication data stored on the RAM 105, writing of gaming parameter required for a game, setting of a start address of a sequence program.

Then, the CPU 103 judges whether there is an automatic coin inlet request, in other words, judges whether there was a replay prize in the previous game (ST 302). If judged as "YES", coins requested are automatically inlet and goes to the process of ST 305. If ST 302 judges "NO", whether new coins were inserted or not, in other words, whether there is an input from the inlet coin sensor 117 due to coins inlet by a player into the coin slot 28, whether there is an input by the operation of various BET switches 16, 17 and 18 are judged (ST 304).

If this is judged "YES", goes to ST 305. If "NO", the input signal is monitored until BET operation is executed.

Then, the CPU 103 judges whether there is an input by the operation of the start lever 26 (ST 305). If judged as "YES", goes to ST 306, and if "NO", input signals are monitored until the start lever is operated.

Then, probability lottery process is carried out (ST 306). In the probability lottery process, at first, random number values for a lottery is extracted in the range of "0 to 16383" using random number generator 108 and sampling circuit 109. A prize range to which an extracted random number belongs is judged by using an prize probability table (FIG. 9) that sets a random number value range (prize range) depending on the gaming state and inlet medal number and related internal prize pattern (winning flag) is determined. Then, if a determined winning flag is the SB prize pattern or bell prize pattern, a stop table to be used is determined.

A stop table is carried out by a random number lottery process using a probability table that has even random number range for six types of stop tables as shown in FIG. 8.

Then, WIN lamp lighting process is carries out (ST 307). WIN lamp lighting process lights up WIN lamp 12 at a certain probability when a bonus prize patterns such as BB and RB are won internally. In this embodiment, a player cannot recognize lighting up of the WIN lamp. It plays a role as a starting trigger of a ling attraction.

Then, gaming information of the main control circuit 101 is sent to the sub-control circuit when starting a gaming start (ST 308). Transmitted commands include, as shown in the "start command" the gaming information command table of the FIG. 26, a winning flag determined by the above-mentioned probability lottery process, current gaming state, stop table number determined depending on an winning flag and number of inlet coins.

Then, whether a predetermined time, for example 4.1 sec, has passed with the one game monitoring timer set in the previous game is judged (ST 309). If judged as "YES", one game monitoring timer for the following game is set (ST 311). If judged as "NO", one game monitoring timer is set for the following game (ST 311) after the remaining predetermined time is expired (ST 310).

Then, the CPU 103 controls the motor driving circuit 111 and, carries out a rotation process of reels 9L, 9C and 9R (reel rotation process) (ST 312). Reel rotation process carries out an acceleration process starting from the state where the reels 9L, 9C and 9R stop, and constant-speed process after a predetermined speed is reached. The stop buttons 27L, 27C and 27R, and stop operation of the reels 9L, 9C and 9R are enabled on the condition of this constant-speed state.

Then, the CPU 103 judges whether any one of stop buttons 27L, 27C and 27R was operated (Is the stop button on?), in other words, whether there is any stop signals sent from the reel stop signals circuit 118 when a player operates the stop buttons 27L, 27C and 27R. If judged as "YES", goes to ST 315. If judged as "NO", goes to the process ST 314. The process ST 314 judges whether the value of the automatic stop timer is "0" or not. The automatic stop is a process to stop automatically the reels 9L, 9C and 9R after a predetermined period of time (for example 40 seconds) has passed since the reels started rotating even if they are rotating because stop buttons 27L, 27C and 27R are not pressed. If judged as "YES", in other words, the automatic stop timer was "0", goes to ST 315 in order to automatically stop the reels. If judged as "NO", goes to process ST 313 in order to keep on monitoring reception of stop operations.

In the process ST 315, the CPU 103 carries out "slip frame number determination process". The "slip frame number determination process" determines the slip frame number of a reel corresponding to a stop button that received a stop operation. "slip frame number" used herein means the number of symbols (frame number) to be slipped before stopping the reel (actual stopped position is called "stop position") from the symbol position (referred to as "stop operation position") displayed in the display window 8L, 8C and 8 R when the stop buttons 27L, 27C and 27R were pressed.

Then, the CPU 103 controls the motor driving circuit 111 so that a reel corresponding to a stop button that received a stop operation is stopped after rotating by determined number of slip frames (ST 316).

Then, the CPU 103 transmits "reel stop command" indicating a reel has been stopped to the sub-control circuit 201 (ST 317).

Figure 28:
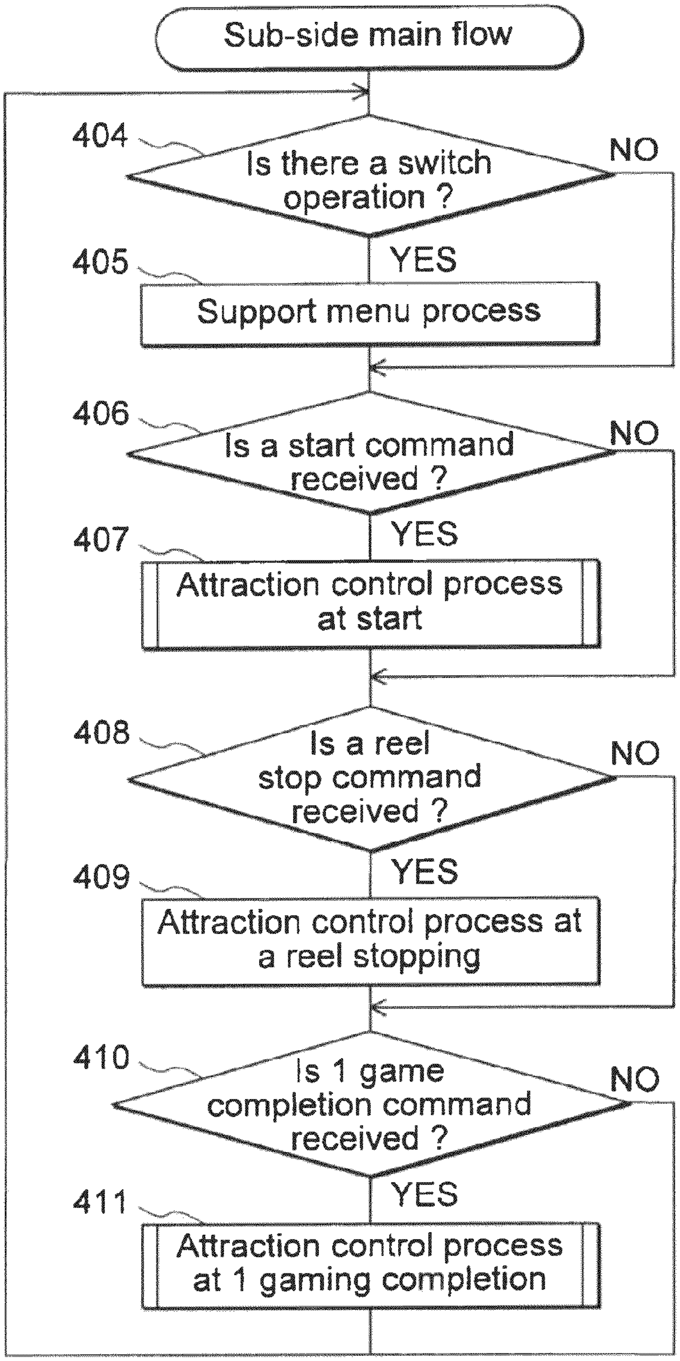
FIG. 28 is a flow chart showing a sub-side main flow.

The reel stop command, as shown in FIG. 28 gaming information command "reel stop command", transmits the stop order status (What number of the current stop operation?) and, stop reel status (Which reel has received a stop operation?) to the sub-control circuit 201.

Then, the CPU 103 judges whether all reels stopped or not. If judged as "YES", goes to ST 319. If judged as "NO", there remain some rotating reels and goes to ST 313.

Then, the CPU 103 carries out a winning search process (ST 319). This winning search process judges whether a stop mode of a symbol Displayed in the display windows 8L, 8C and 8 R denotes an established winning. If it is a stop mode to denote an established winning, a winning flag of a related winning pattern is stored on the RAM 105. Specifically, a judgment is carried out by cross-checking a code number of a symbol on the center line L1 with the winning symbol combination table stored on the ROM 104.

Then, a judgment is carried out by cross-checking a winning flag and won flag for matching to confirm the current winning is normal (ST 320). If this judged "NO", an "illegal error" is displayed. Execution of gaming program is interrupted. If ST 320 judged "YES", coins are paid out corresponding to the established winning pattern type and gaming status (ST 322).

Then, if a gaming state is changed by completing the current gaming, the migration process is carried out (ST 323). ST 323 includes the final winning of a bonus gaming, a bonus internally won by the current gaming, start of bonus gaming by "7-7-7" and symbols stopped on the effective line.

Then, types of established winning pattern and gaming state, etc are sent to the sub-control circuit as "1 game completion command" as shown in the gaming command table of the FIG. 10 (ST 324).

Figure 26:
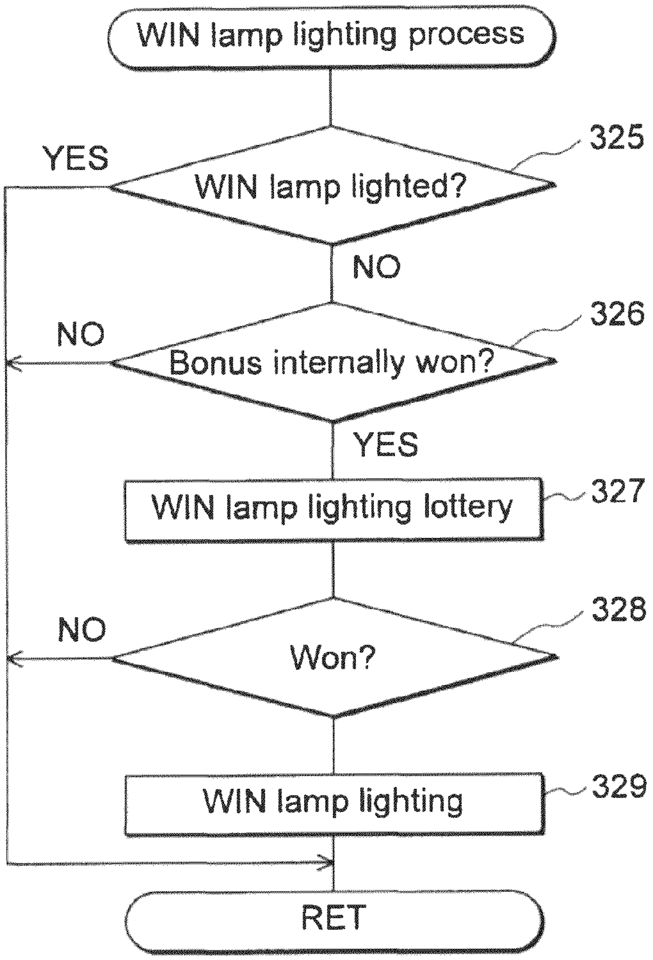
FIG. 26 is a flow chart showing a lighting process of WIN lamp.

FIG. 26 is a flow chart showing WIN lamp lighting process. First, the CPU 103 judges whether WIN lamp has already lighted up (ST 325). If judged as "YES", passes the process and returns to the main flow. If judged as "NO", then, whether a bonus is internally won is judged (ST 326). If judged as "NO", returns to the main flow because it is not required to turn on the WIN lamp. If judged as "YES", then, a lottery process to decide WIN lamp shall be turned on or not is carried out. The lottery is carried out by using WIN lamp lighting lottery table (winning probability 1/6) and lottery random number value stored on the ROM 104 (ST 327). Then, whether it is won in the lottery process is judged (ST 328). If the result of the judgment is "YES", WIN lamp 329 is turned on (ST 329) and returns to main flow. If judged as "NO", returns to the main flow without doing anything.

Then, control operation of the sub-CPU 203 of the sub-control circuit 201 will now be explained.

Figure 27:
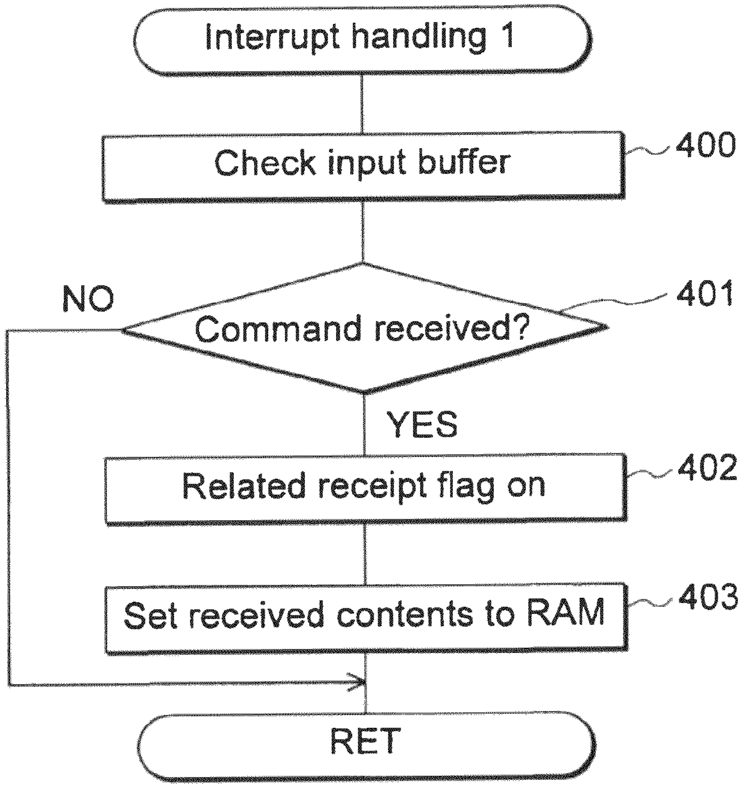
FIG. 27 is a flow chart showing an interrupt process 1.

FIG. 27 is a flow chart showing the interrupt process 1. The interrupt process 1 is executed in the interrupt process per 3 ms. The interrupt process 1 carries out processes to store gaming information commands sent from the main control circuit 101 and input signals from the cross button 19, determination button 20, and cancel button 21 on the sub-RAM 205.

First, the sub-CPU 203 checks the input buffer (ST 400) and judges whether there is an input signal in the input buffer (ST 401). If judged as "YES", receiving flag is turned on (ST 402), contents of the received command are set to the sub-RAM 205 (ST 403), and the process is completed. If judged as "NO", the process is completed as it is.

FIG. 28 is a diagram showing the main flow chart of the sub-control circuit side. First, the sub-CPU 203 checks the receiving flag of the sub-RAM 205. As shown above, gaming information on the main control circuit 101 stored on the receiving flag include a start command generated when a player operates the start lever 26, a reel stop command generated when operating stop buttons 27L, 27C and 27R to stop rotating reels 9L, 9C and 9R, and a 1 gaming completion command generated after carrying out payment of coins in case of a prize to stop all reels. Various attraction processes are carried out by each command.

First, the sub-CPU 203 checks the receiving flag area in the sub-RAM 205, and judges whether there are input operations about the gaming support menu including the cross button 19, determination button 20, cancel button 21 and so on (ST 404). If judged as "NO", skips ST 405 and goes to ST 406. If judged as "YES", it carries out processes corresponding to inputs including display and edit of the support menu (ST 405).

Then, it judges whether a start command has been received (ST 406). If judged as "NO", it skips ST 407 and goes to ST 408. If judged as "YES", it executes an attraction control process at start (ST 407). This process carries out control process of BR if during BR. Details will be hereinafter described.

Then, it judges whether reel stop command is received or not. (ST 408). If judged as "NO", skips ST 409 and moves to ST 410, and if judged as "YES", it executes an attraction control process when stopping a reel (ST 409). This process carries out announcement of stopping order during BR generation lottery process and BR, and attraction corresponding to conformity between announcement contents and real stop operation. Details will be hereinafter described.

Then, it judges whether 1 game completion command has been received or not (ST 410). If judged as "NO", it skips ST 411 and returns to process ST 404, repeats the same process. If judged as "YES", then, it executes attraction control process after 1 gaming completion (ST 411). This process updates BR continuance number, and outputs gaming information to the gaming state display device if during BR. Details are to be hereinafter described.

After the process ST 411 is completed, it returns to ST 404, and repeats the same process. Thus, the main flow chart of the sub-control circuit 201, based on the gaming information command sent from main control circuit 101, repeats a process to branch to related attraction processes.

Figure 29:
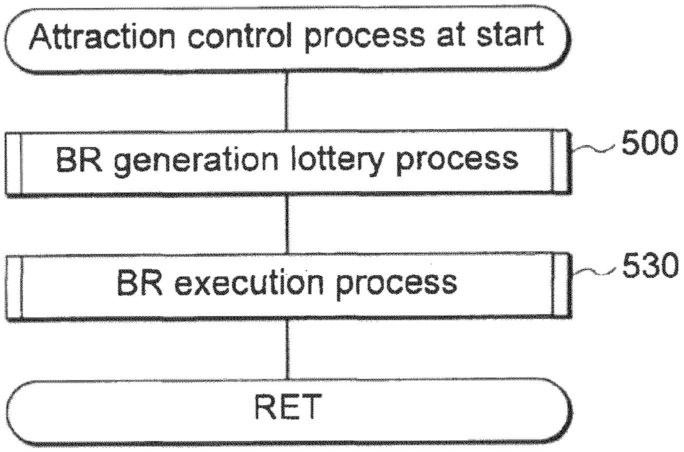
FIG. 29 is a flow chart showing an attraction control process at starting.

FIG. 29 is a flowchart to show an attraction control process at start. The sub-CPU 203 carries out BR generation lottery process (ST 500). BR generation lottery process is a process to determine whether to generate battle rush as a specific game or not. Details are to be hereinafter described. Then, it carries out BR process (ST 530). BR execution process is to carry out stop order announcement during BR. Details are to be hereinafter described.

Figure 30:
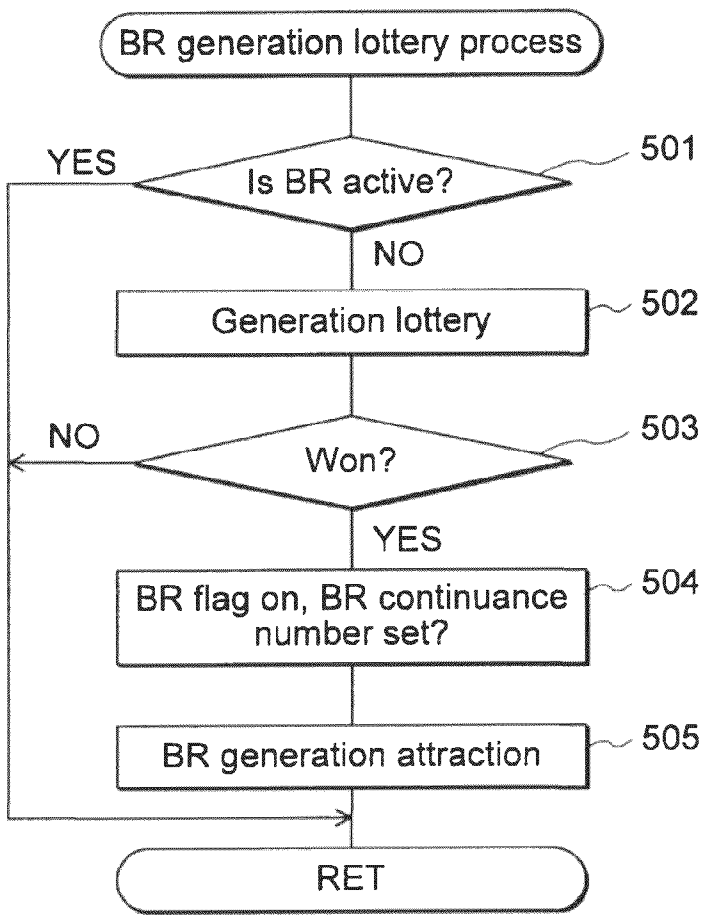
FIG. 30 is a flow chart showing a BR generation lottery process.

FIG. 30 is a flow chart showing the BR generation lottery process. First, the sub-CPU 203 checks BR flag stored on the sub-RAM 205 and judges whether it is during BR gaming or not (ST 501). If judged as "YES", it returns to the attraction control process at starting without doing anything. If judged as "NO", it judges whether any BR continuance number is won referring to BR generation lottery table shown in FIG. 21 (ST 502, 503). If judged as "NO" (loss), returns to the attraction control process at starting. If judged as "YES", it turns on the BR flag of the sub-RAM 205, sets a continuance number won in the BR continuance number (ST 504), carries out BR generation attraction (ST 505) and returns to attraction control process at starting.

Figure 31:
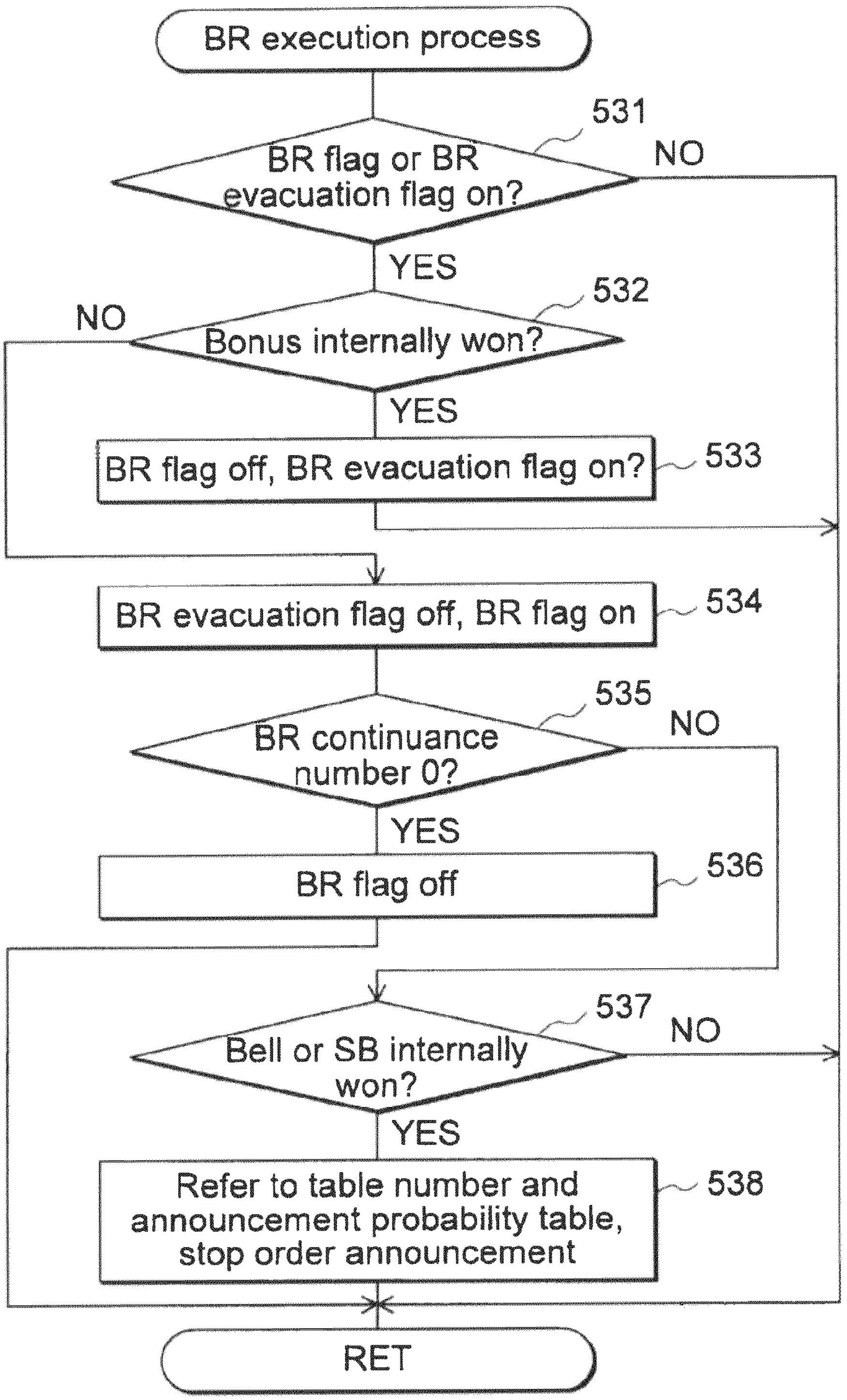
FIG. 31 is a flow chart showing a BR execution process.

FIG. 31 is a flow chart showing BR execution process. First, the sub-CPU 203 checks BR flag and BR evacuation flag of the sub-RAM 205 and judges whether it is during BR or bonus generated during BR and BR is interrupted (ST 531). If judged as "NO", since it is not during BR, returns to the attraction control process at start without doing anything. If judged as "YES", it checks a receiving flag of the sub-RAM 205, and judges whether bonus prize pattern is internally won (ST 532). If judged as "YES", it interrupts BR, turns off BR flag and turns on BR evacuation flag of the sub-RAM 205 in order to digest bonus gaming (ST 533) and returns to attraction control process at start.

If ST 532 judges as "NO", then, in the case during BR evacuation, in order to restart BR, it turns off BR evacuation and turns on BR flag of the sub-RAM 205 (ST 534). Then, it checks BR continuance number of the sub-RAM 205 in order to judge whether BR continuance number has been all digested (ST 535). If judged as "YES", it means BR has been completed. It turns off BR flag (ST 536) returns to attraction control process at start.

If judged as "NO", a predetermined game number of BR has not been completed, then, it checks receiving flag of the sub-RAM 205 and judges whether bell or SB is won internally in the current game (ST 537). If judged as "YES", it announces an appropriate stop order referring to a selection stop table stored in the receiving flag of the sub-RAM 205 (ST 538) and returns to the attraction control process at start. If judged as "NO", it returns to the attraction control process at start without announcing anything.

Figure 32:
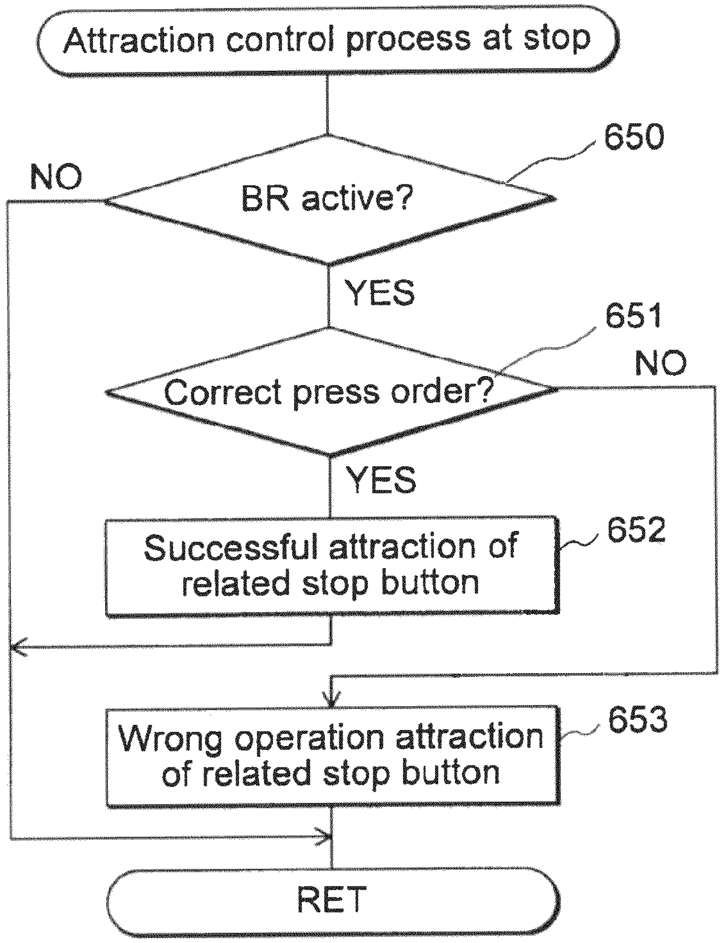
FIG. 32 is a flow chart showing an attraction control process at stop.

Then, the attraction control process when stop buttons 27L, 27C and 27R are operated during BR will now be explained. FIG. 32 is a flow chart showing an attraction control process when a reel is stopped. First, the sub-CPU 203 checks BR flag of the sub-RAM 205 and judges whether it is during BR or not (ST 650). If judged as "NO", it returns to the sub-side main flow without doing anything. If judged as "YES", then, it checks the stop command of the receiving flag of the sub-RAM 205, cross-checks stop order data and stop reel data with used table No data, and judges whether the current stop operation corresponds to the correct press order (ST 651). If judged as "YES", it displays the stop operation was performed with a correct depression order (ST 652). If judged as "NO", it displays the stop operation was performed with a wrong depression order (ST 653), and returns to the sub-side main flow.

Figure 33:
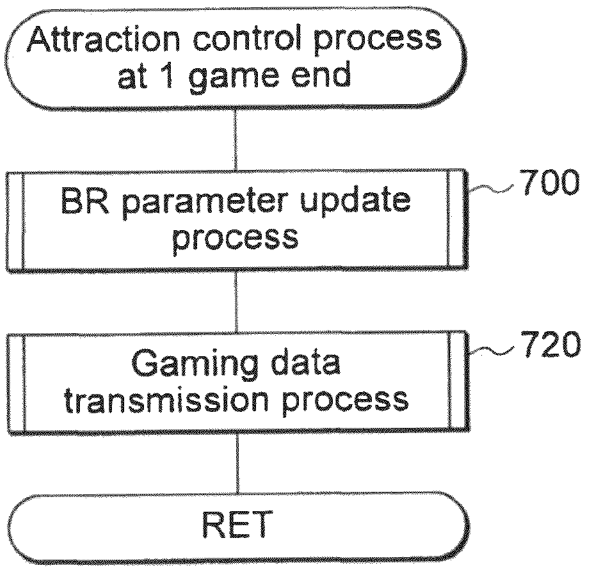
FIG. 33 is a flow chart showing an attraction control process when one gaming ends.

Then, attraction control process carried out after all reels have stopped will now be explained. FIG. 33 is a flow chart showing an attraction control process when one gaming has been finished. First, the sub-CPU 203 carries out BR parameter update process to update gaming parameter about BR (ST 700), then it sends the gaming information of the current game, specifically, inlet coin number, payout coin number, bonus internal winning information to the outer communication control circuit (ST 720), returns to sub-side main flow. The outer communication control circuit 259 subsequently sends the gaming information to the gaming information display device 80.

Figure 34:
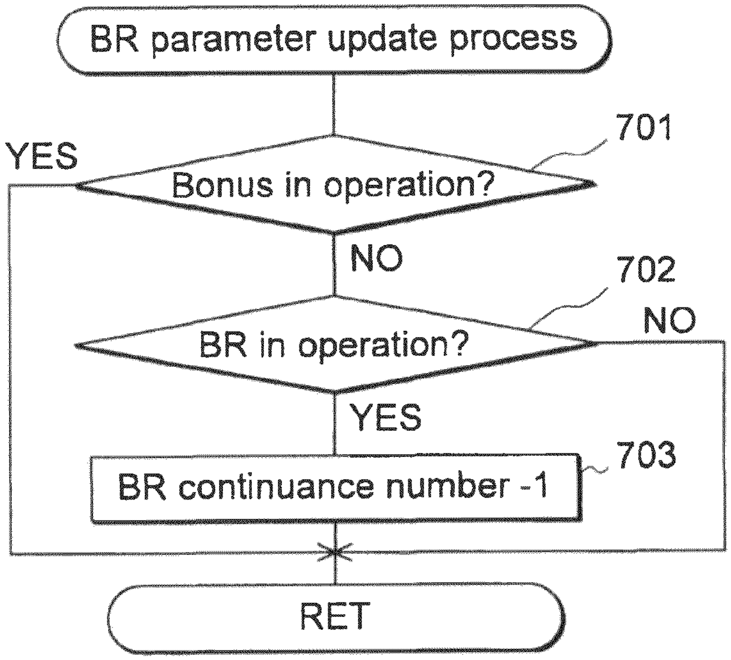
FIG. 34 is a flow chart showing a BR parameter update process.

FIG. 34 is a flow chart showing BR parameter update process. First, the sub-CPU 203 checks 1 gaming completion command of receiving flag stored on the sub-RAM 205 and judges whether the current gaming state is during bonus or not (ST 701). If judged as "YES", it cannot be during BR and it returns to attraction control process of 1 gaming completion without doing anything. If judged as "NO", then, it checks BR flag stored on the sub-RAM 205 and judges whether it is during BR (ST 702). If judged as "NO", it returns to attraction control process of 1 gaming completion without doing anything. If judged as "YES", it reduces BR continuance number counter of the sub-RAM 205 (ST 703), and returns to attraction control process of 1 gaming completion.

Figure 35:
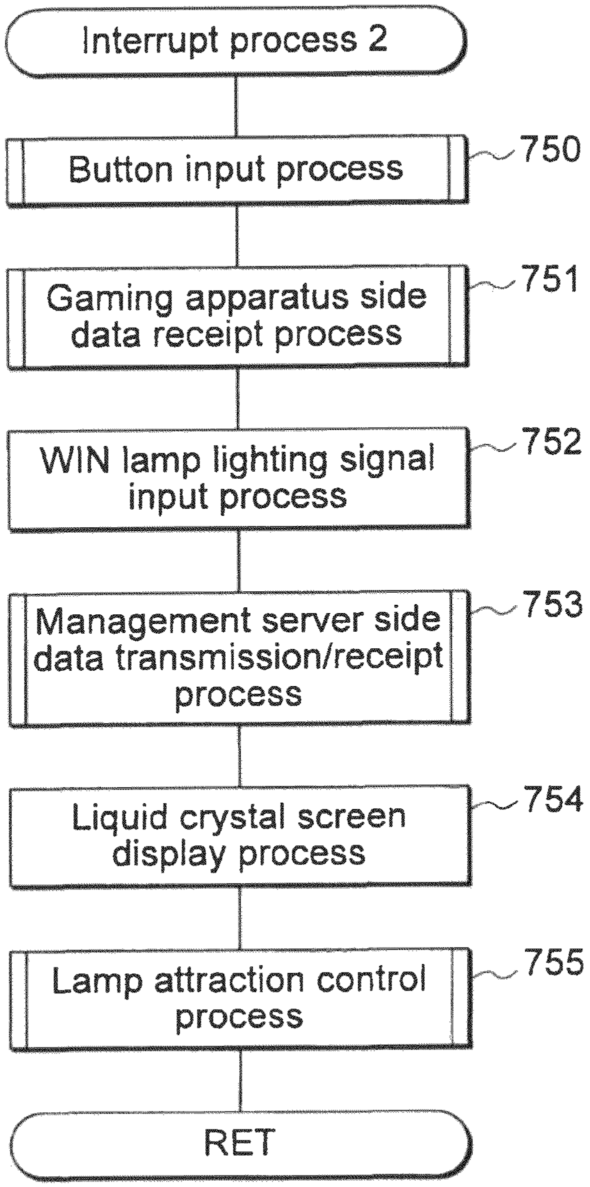
FIG. 35 is a flow chart showing an interrupt process 2.

Then, a control operation of the gaming information display device 80 will now be explained. FIG. 35 is a flow chart showing an interrupt process 2 carried out in the main control part 147 of the gaming information display device. The interrupt process 2 is executed by 3 ms. First, gaming history CPU 148 carries out processes such as switching of display contents and data transmission to management server 54 based on the input signal from various input parts provided in such a manner that players can operate, for example, calling button 83 (ST 750). Then, it carries out a reception process of gaming information sent from outer communication control circuit 259 of the pachi-slot gaming machine 1 (ST 751). Then, it carries out the WIN lamp lighting signals input process to check whether WIN lamp lighting signal has been input (ST 752). Then, it carries out management server side data receipt and transmission process to carry out the receipt and transmission process, if there is attraction control data sent from the management server 54 via island LAN 51 or gaming information to send the management server 54 (ST 753). Then, it completes one interrupt process by executing liquid crystal screen display process (ST 754) and lamp attraction control process (ST 755) in accordance with various attraction data set in the steps shown above.

Figure 36:
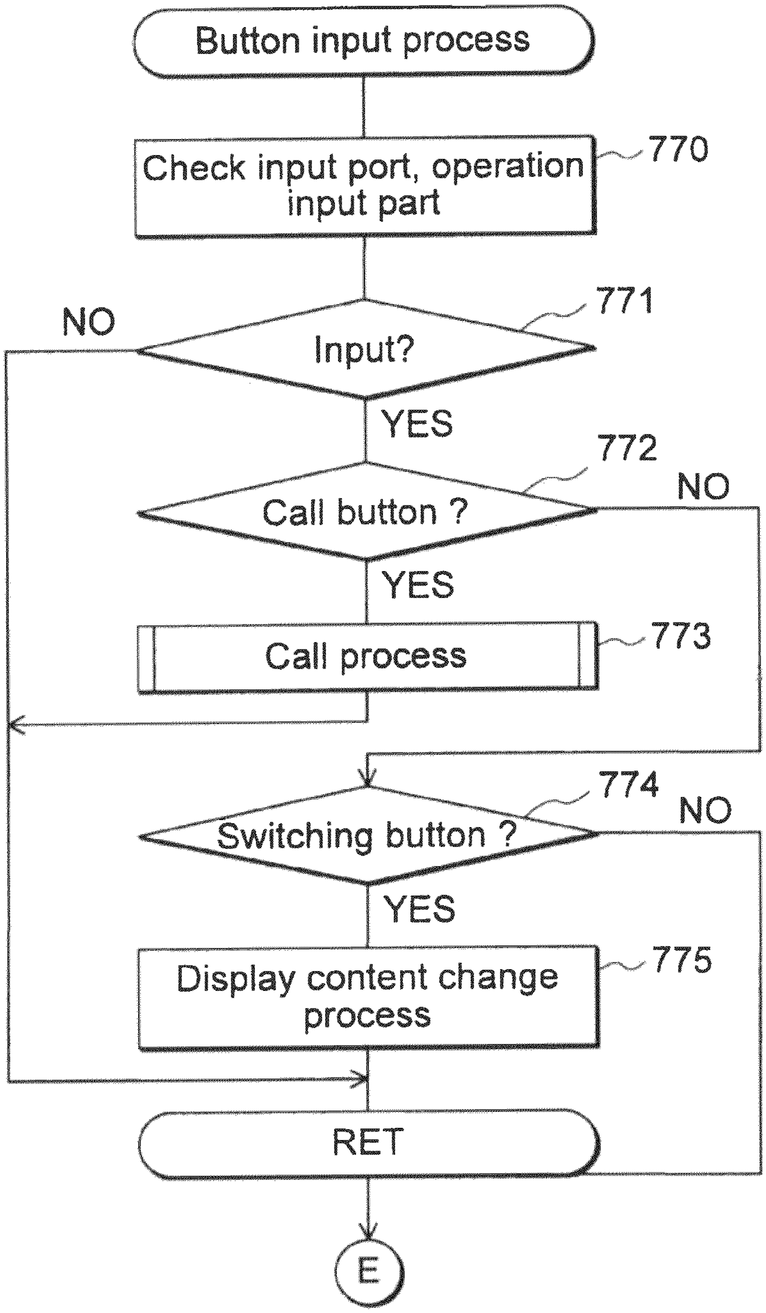
FIG. 36 is a flow chart showing a button input process.
Figure 37:
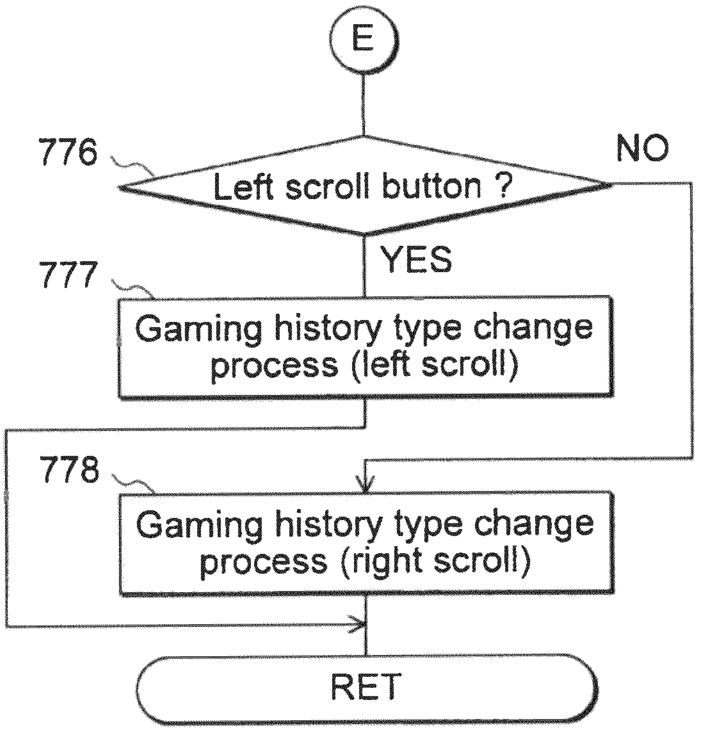
FIG. 37 is a flow chart showing a button input process.

FIG. 36 is a flow chart showing a button input process. First, the gaming history CPU 147 checks the input port of the operation input part to which operation signals are input from operation input part 146 (ST 770) and judges whether there is operation input (ST 771). If judged as "NO", it returns to the interrupt process 2 without doing anything. If judged as "YES", it executes a process to judges the types of operations. First, it judges whether the operation type is calling button 83 (ST 772). If judged as "YES", it executes a calling process (ST 773) and returns to the interrupt process 2. If judged as "NO", then, it judges whether the operation type is the switching button 84 (ST 774). If judged as "YES", it executes a display content change process to change the contents of the information display part 82 into the past history of gaming (ST 775) and returns to interrupt process 2.

Then, it judges whether the operation type is the left scroll button 85 (ST 776). If judged as "YES", it switches the display data type into left scroll (ST 777) and returns to the interrupt process 2. If judged as "NO", since remaining operation types are only right scroll button operation, it switches display data types to the left scroll (ST 778) and returns to the interrupt process 2.

Figure 38:
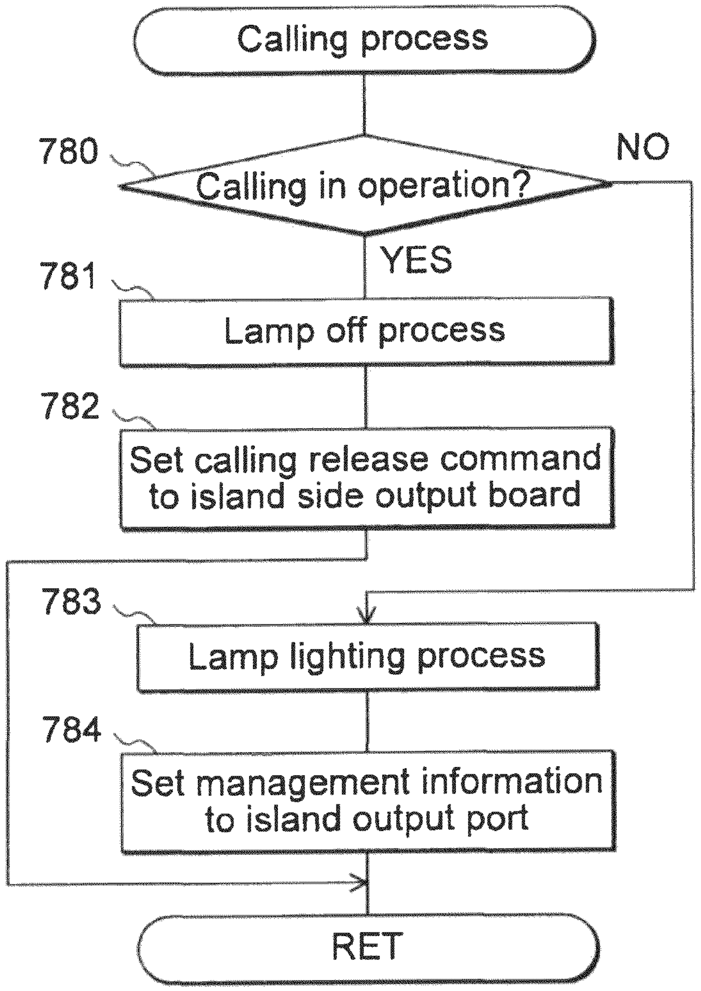
FIG. 38 is a flow chart showing a calling process.

FIG. 38 is a flow chart showing a calling process. First, the gaming history CPU 148 checks the calling flag stored on the gaming history RAM 150 and judges whether the calling button has been operated and being called (ST 780). If judged as "NO", it moves to ST 783 and executes lamp lighting process with the lamp lighting mode in the calling state (all lamps remain lighted) (ST 783), sets the calling information data with the calling button flag on to the island side output port of the management server (ST 784) and returns to the button input process. If judged as "YES", it means the current switching operation is a cancel operation, and it turns off the lights under lighting control (ST 781) and sets calling information set to island side output port in order to notify the management server of the cancelled calling (ST 784) and returns to button input process.

Figure 39:
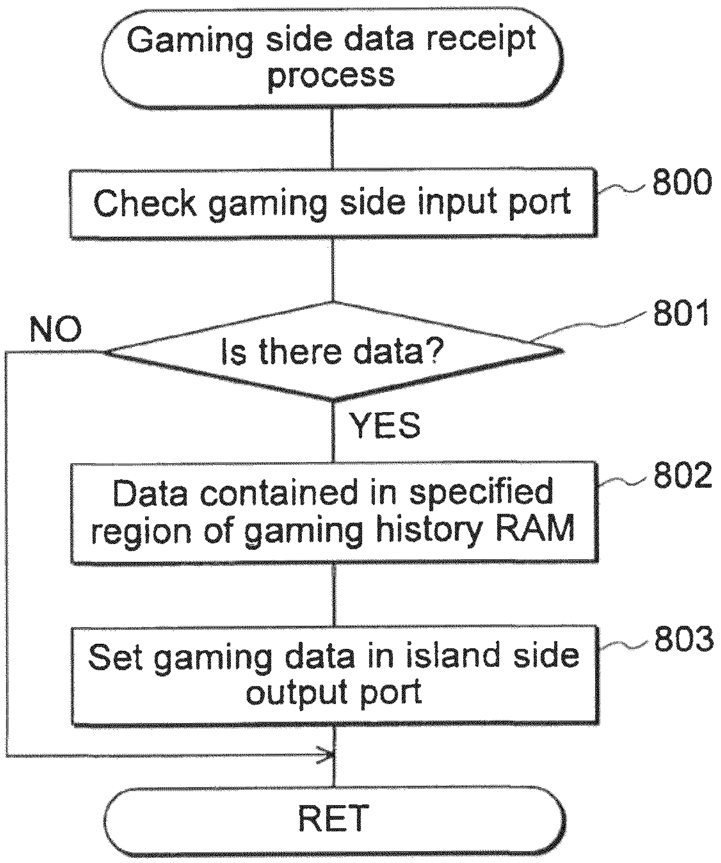
FIG. 39 is a flow chart showing a data receiving process on a gaming apparatus side.

FIG. 39 is a flow chart showing gaming apparatus side data receipt process. First, the gaming history CPU 147 checks gaming apparatus side input port (ST 800) and judges whether there are gaming data sent from the outer communication control circuit 259 of the pachi-slot gaming machine 1 (ST 801). If judged as "YES", it stores the gaming data in a predetermined region of the gaming history the RAM 150 (ST 802) and sets gaming information data (FIG. 20) corresponding to gaming data to the island side output port in order to send it to the management server 54 (ST 803). If judged as "NO", it returns to interrupt process 2 without doing anything.

Figure 40:
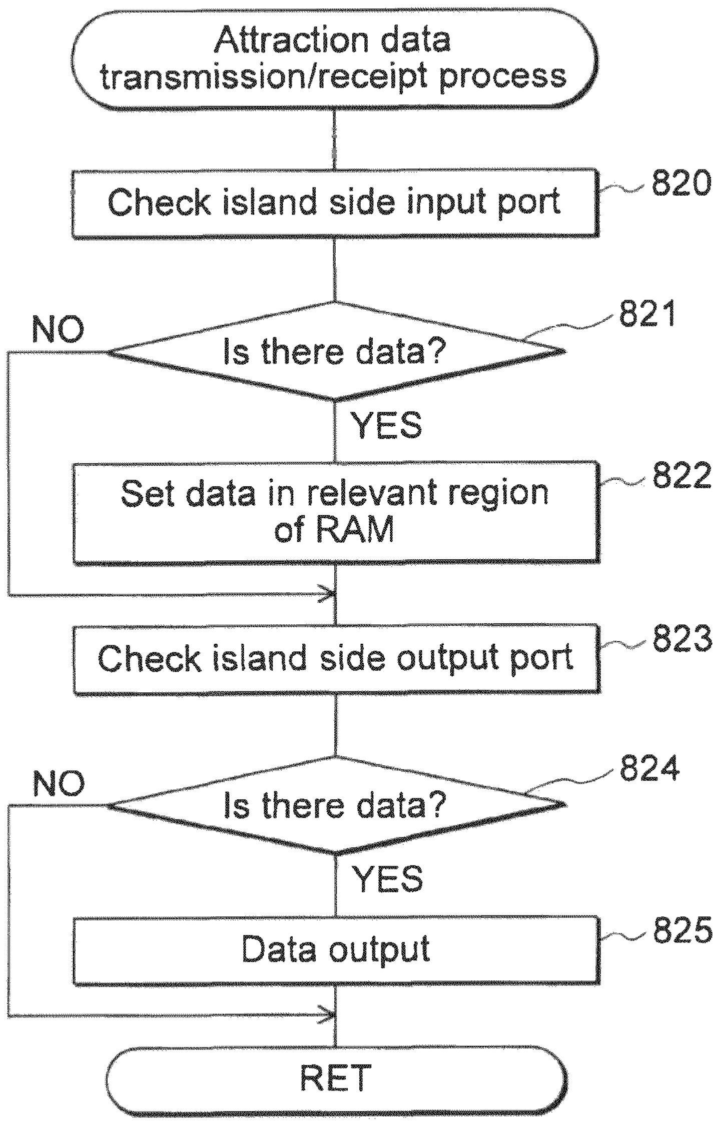
FIG. 40 is a flow chart showing an attraction data sending and receiving process.

FIG. 40 is a flow chart showing attraction data receipt and transmission process. First, the gaming history CPU 147 checks the island side input port and judges whether there are attraction data sent from management server 54 (ST 821). If judged as "NO", it skips ST 822 and moves to ST 823. If judged as "YES", it stores the attraction data in a predetermined region of the gaming history RAM 150 and moves to ST 823.

Then, it checks the island side output port (ST 823) and judges whether there are gaming information data from the gaming information display device 80 to the management server 54 (ST 824). If judged as "NO", it skips ST 825 and returns to the interrupt process 2. If judged as "YES", it outputs the set gaming information data and returns to the interrupt process 2.

Figure 41:
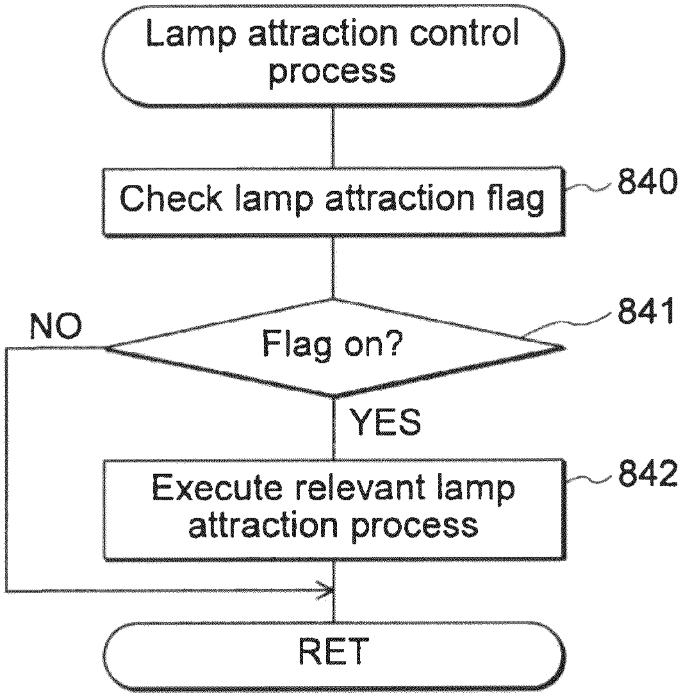
FIG. 41 is a flow chart showing a lamp attraction control process.

FIG. 41 is a flow chart showing the lamp attraction control process. First, the gaming history CPU 148 checks the lamp attraction flag stored in a predetermined region of the gaming history the RAM 150 (ST 840) and judges whether the attraction flag is on (ST 841). If judged as "NO", it returns to the interrupt process 2 without doing anything. If judged as "YES", it carries out an attraction in a related attraction mode among 3 types of attraction mode (ST 842) and returns to the interrupt process 2.

Figure 42:
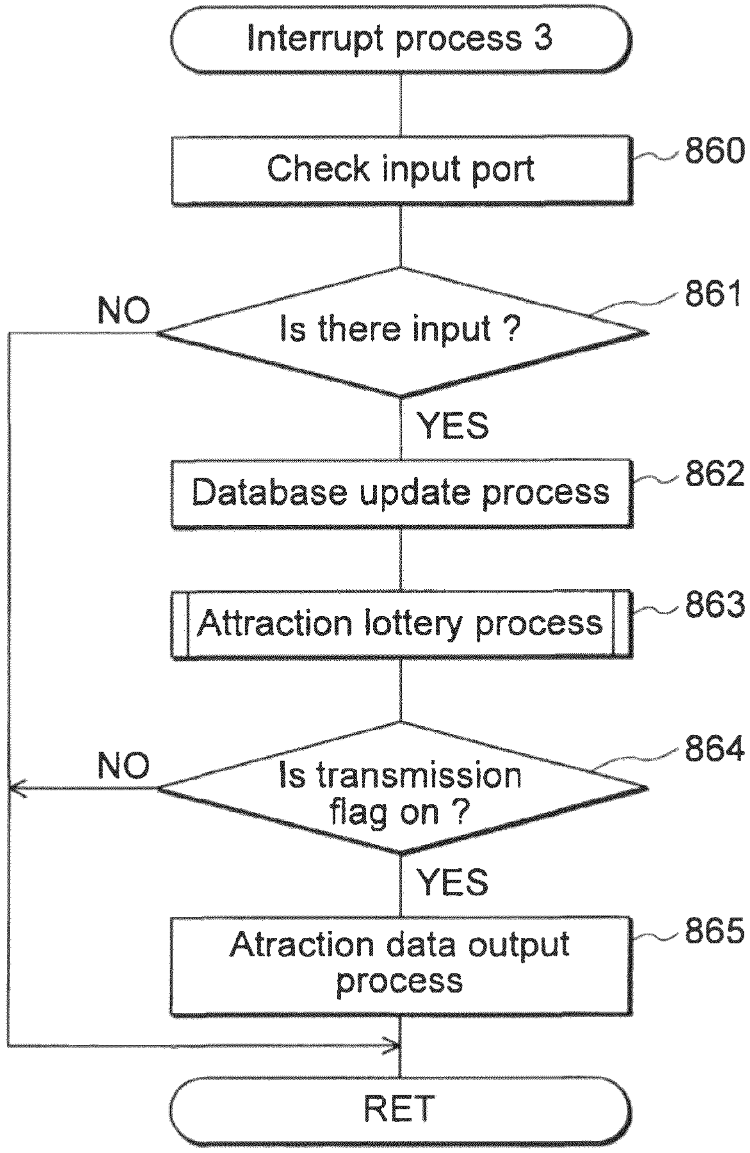
FIG. 42 is a flow chart showing an interrupt process 3.

FIG. 42 is a flow chart showing the interrupt process 3 executed in the management server 54. The interrupt process 3 is carried out every 3 ms. First, the management CPU 168 checks the input port (ST 860) and judges whether transmission data from each gaming information display device have been received (ST 861). If judged as "NO", it terminates the process without doing anything. If judged as "YES", then, it stores and updates the received data in the gaming information database 163 (ST 862) and carries out an attraction lottery process (ST 863). Then, it judges whether the transmission flag stored in the predetermined region of the management the RAM 160 is on, in other words, it is the transmission timing of the determined attraction data (ST 864). If judged as "NO", it terminates the process without doing anything. If judged as "YES", it sends data to the gaming information display device with a related unit number (ST 865) and terminates one time process.

Figure 43:
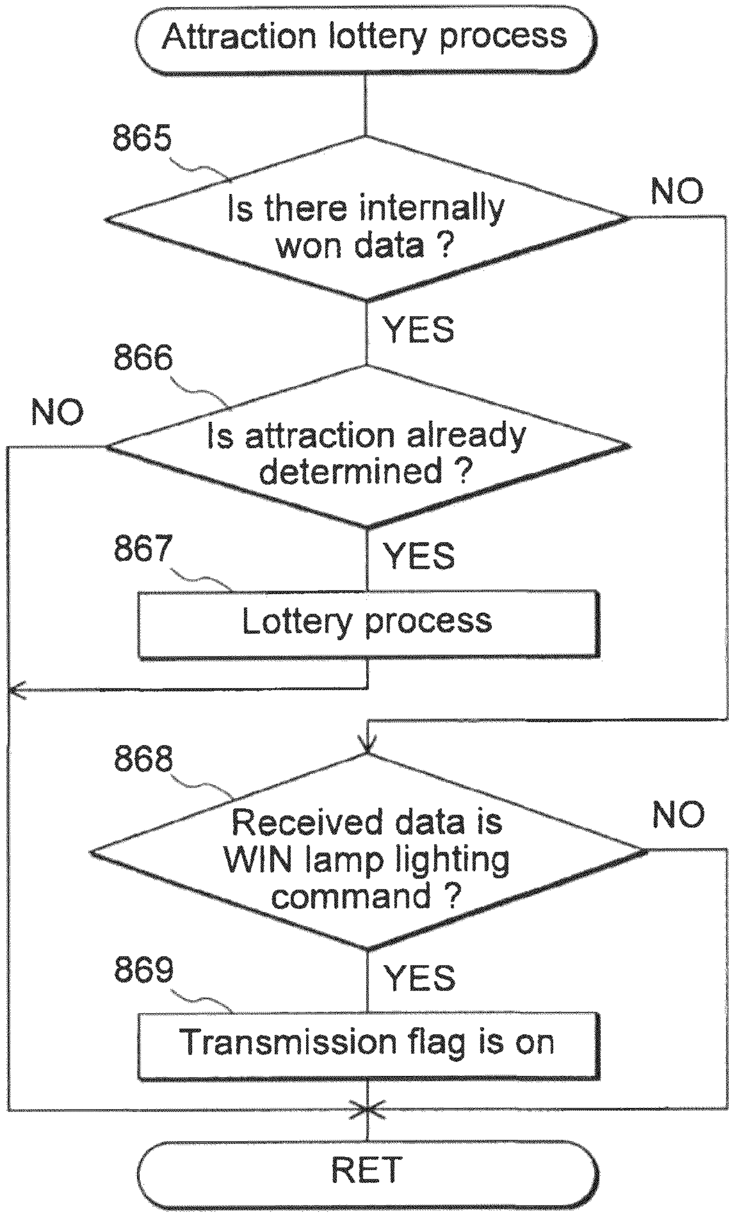
FIG. 43 is a flow chart showing an attraction lottery process.

FIG. 43 is a flow chart showing an attraction lottery process. First, the management CPU 168 judges whether the currently sent data is an internally won data (ST 865). If judged as "YES", then, it judges whether an attraction of a related gaming apparatus has been already determined, in other words, internal winning information of the related gaming unit has been received before receiving current data (ST 866). If judged as "YES", it returns to the interrupt process 3 without doing anything. If judged as "NO", it is the first reception after the internally won bonus. It determines a link attraction based on the link attraction mode lottery table stored in the link attraction data stored on means 164, and a unit number to send the link attraction determined in accordance with the link attraction sent unit lottery table and returns to the interrupt process 3.

If judged as "NO" in the judgment of ST 865, then, it judges whether the received data is WIN lamp lighting information (ST 868). If judged as "NO", it returns to the interrupt process 3 without doing anything. If judged as "YES", it is the transmission timing of the link attraction data, it turns on the transmission flag of the management the RAM 160 (ST 869) and returns to the interrupt process 3.

In this embodiment, as an example of specific games, advantageous status generated for players by resolving the problems was explained using ST period. In addition to the aforementioned AT and advantageous status for players, a won flag of specific prize pattern may be established or internal winning probability of a prize pattern may be increased.

In order to attain the object of the present invention, numerous and various modifications can be made without departing from the spirit of the invention.

(Second Embodiment)

A second embodiment of the present invention is described as an example of a modification.

Constituent elements and processes of the second embodiment such as, for example, gaming apparatuses, a management server, a probability lottery process and the like are generally similar to those of the first embodiment shown in FIGS. 1 through 43, except that the display windows 8L, 8C, 8R are constituted by a liquid crystal display device and the WIN lamp lighting process is modified as described in detail below. Where it is possible, similar elements and processes are identified with identical reference numerals as in the depiction of the first embodiments of FIGS. 1 through 43.

Figure 44:
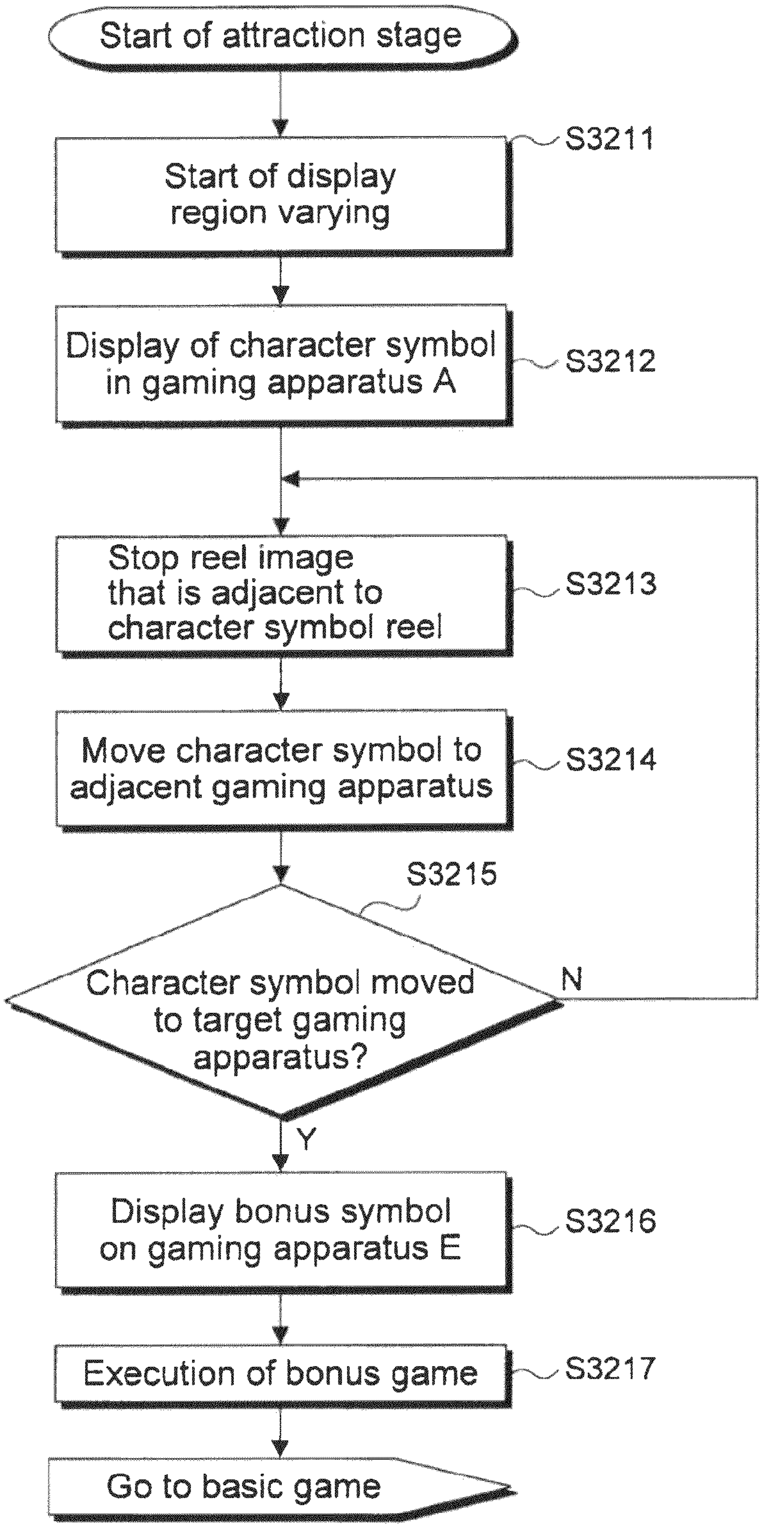
FIG. 44 is a flow chart showing a lighting process of WIN lamp of a second embodiment.

FIG. 44 is a flow chart showing the WIN lamp lighting process of the present embodiment.

Figure 45:
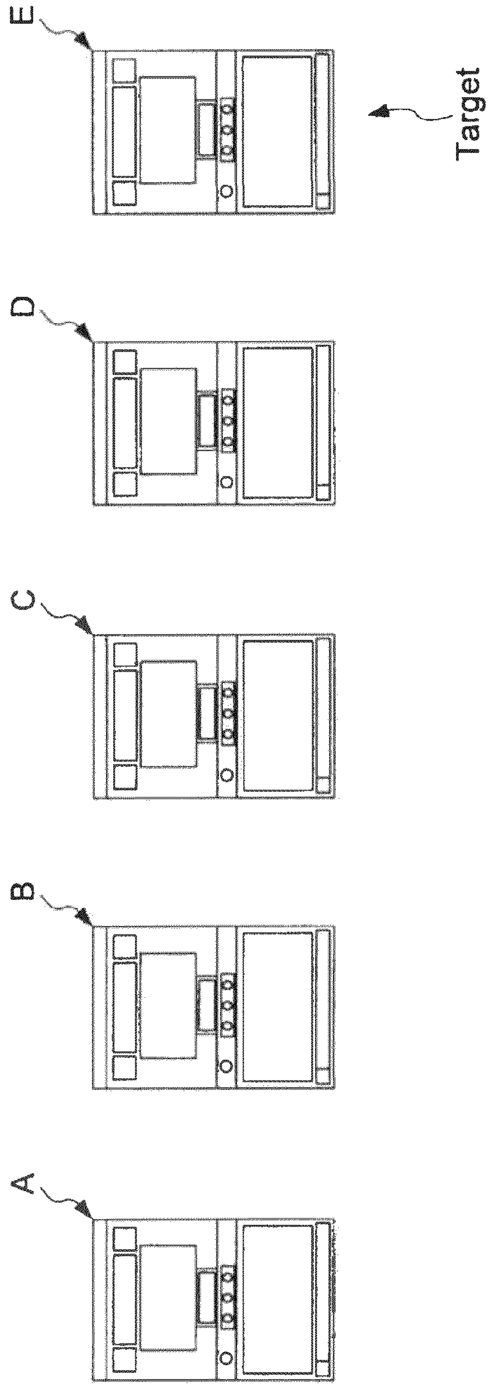
FIG. 45 is a diagram showing a plurality of linearly aligned gaming apparatuses.

In the present embodiment, if it is judged that a bonus has been won in ST 328 of the WIN lamp lighting process shown in FIG. 26 described in the first embodiment, the main control circuit 101 of the gaming apparatus transmits gaming information to the management server 54. Upon receiving the gaming information, the management server 54 is operated to (i) identify the target gaming apparatus, in which a bonus is internally won (referred to as "target gaming apparatus" hereinafter), and at least one gaming apparatus disposed in the vicinity of the target gaming apparatus (referred to as "neighboring gaming apparatuses" hereinafter) from among the plurality of gaming apparatuses, based on the gaming information and (ii) transmits the determined link attraction data with an identifier of the target gaming apparatus and neighboring gaming apparatuses. In the present embodiment, it is assumed that the neighboring gaming apparatuses A to D and the target gaming apparatus E are linearly aligned as shown in FIG. 45.

Figure 46:
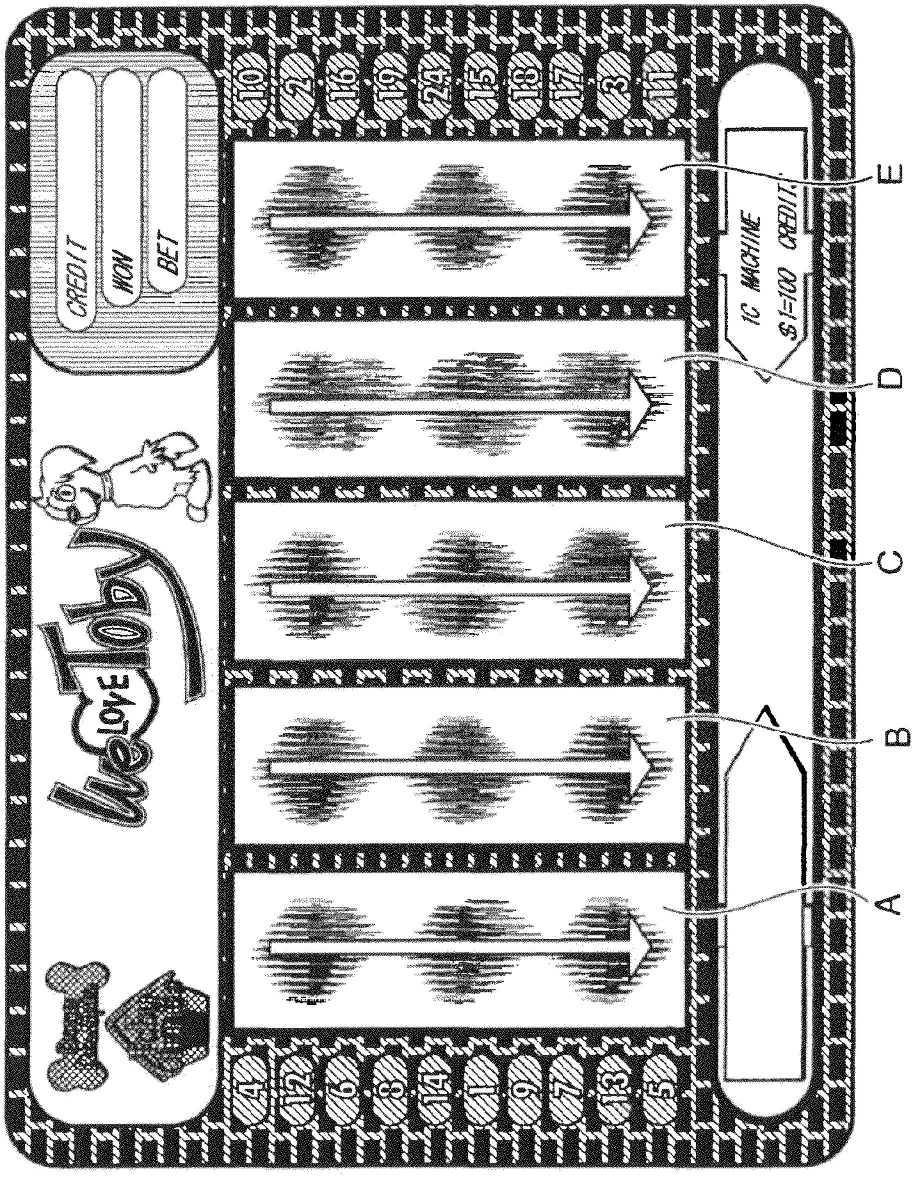
FIG. 46 is a view of display windows in which each reel image is varying.
Figure 47:
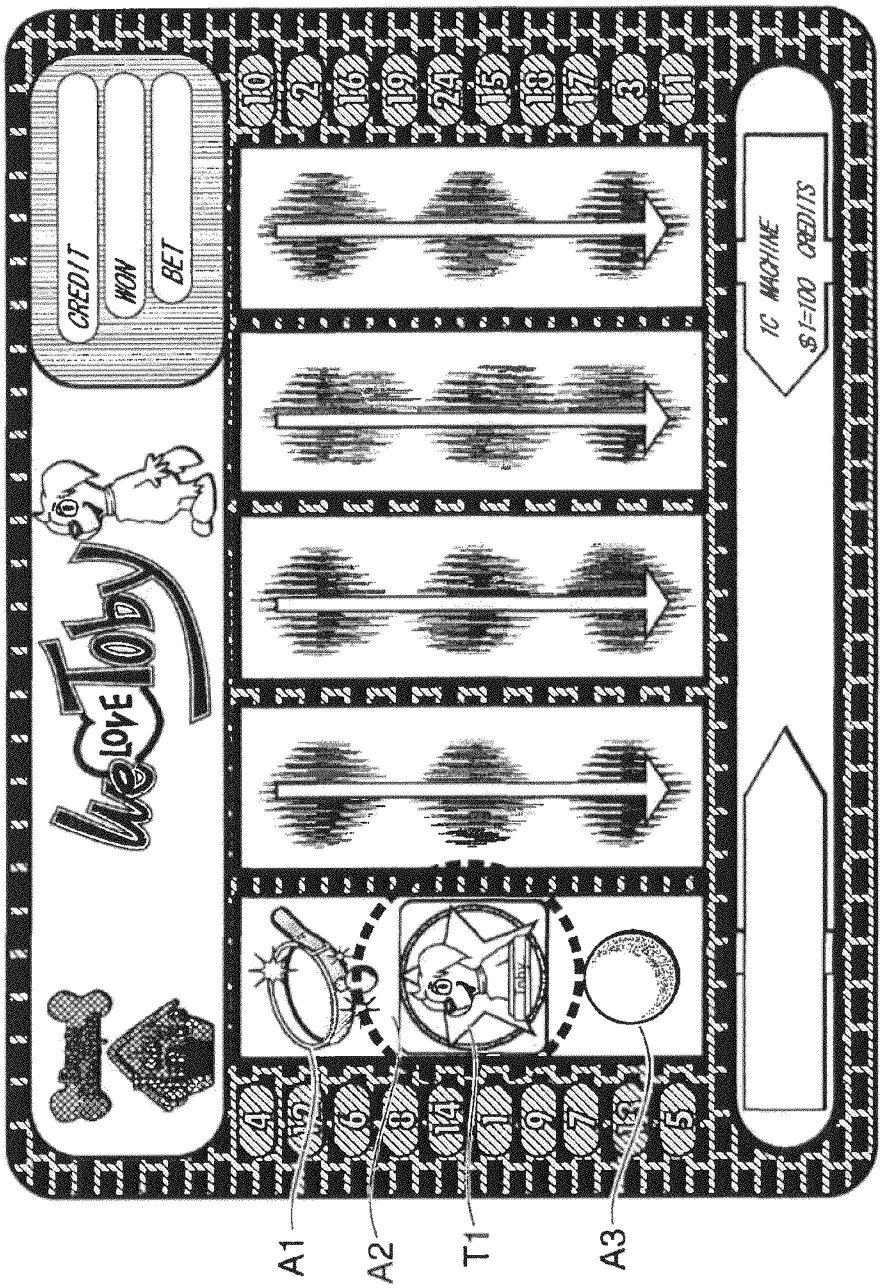
FIG. 47 is a view of display windows in which a character symbol is displayed.
Figure 48:
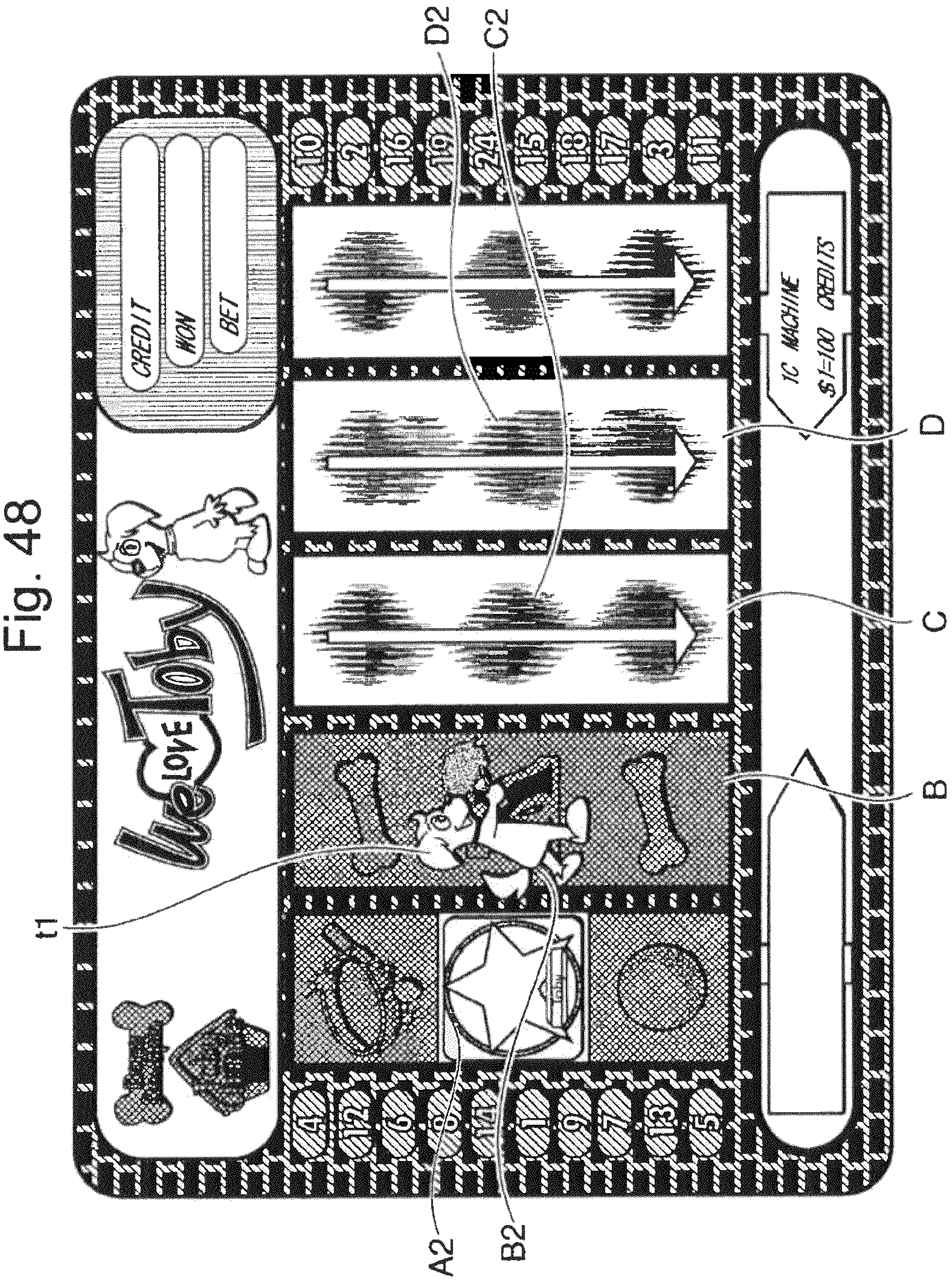
FIG. 48 is a view of display windows in which the character symbol moves from a display window to another display window of each of gaming apparatuses.
Figure 49:
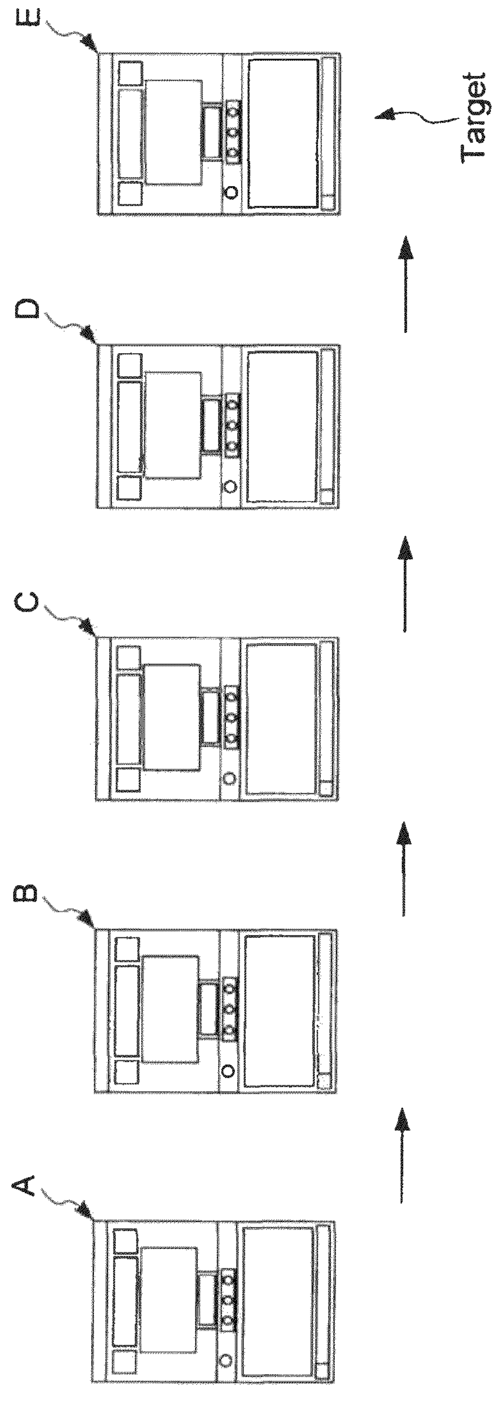
FIG. 49 is a diagram explaining how the character symbol moves through neighboring gaming apparatuses to a target gaming apparatus.

All display windows of each of the neighboring gaming apparatuses A to D and the target gaming apparatus E are made to be varyingly displayed as shown in FIG. 46 in accordance with the determined link attraction data (ST 3211). Then, as shown in FIG. 47, a character T1 is made to stop on the display window A of one of the neighboring gaming machines in accordance with the determined link attraction data (ST 3212). After that, as shown in FIG. 48, the reel including the display window A that is adjacent to the display window B where the character symbol t1 exists is made to stop in accordance with the determined link attraction data (ST 3213). Then, the character symbol t1 is transferred from the display window B to the display window D in accordance with the determined link attraction data (ST 3214). More specifically, after the character symbol t1 moves from the display window A2 to B2, the reel C is made to stop, the character symbol t1 is transferred from the display window B2 to C2, followed by the reel image D being made to stop, and the character symbol t1 being made to transfer from the display window C2 to D2. Step ST 3213 to step ST 3214 are repeated until the character symbol t1 moves through the neighboring gaming machines A, B, C, and D to the display window D2 of the target gaming machine E in accordance with the determined link attraction data (ST 3215). FIG. 49 is a diagram explaining how the character symbol t1 moves through the neighboring gaming apparatuses A, B, C, and D to the target gaming apparatus E.

Figure 50:
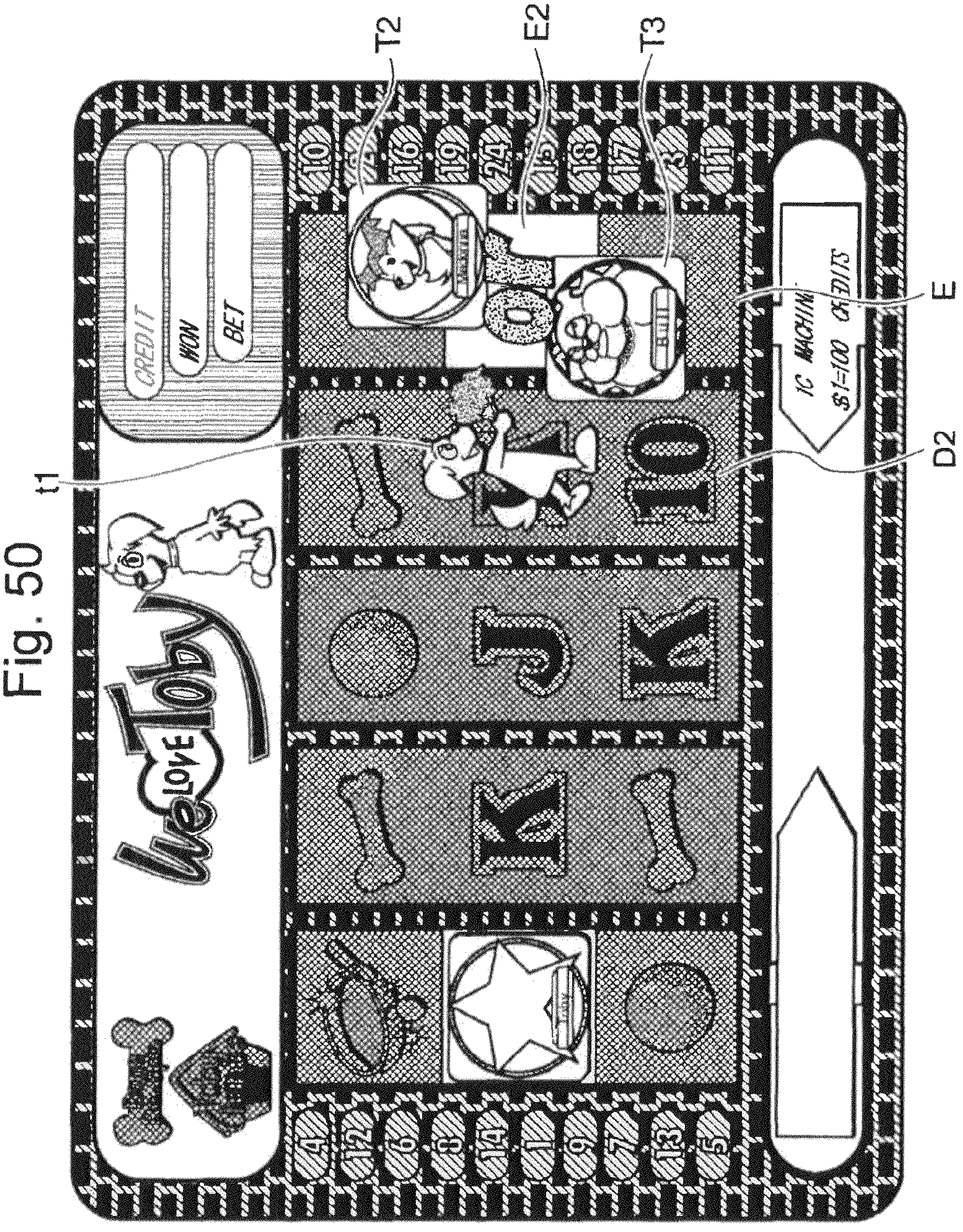
FIG. 50 is a view of display windows in which the character symbol has been stopped and a Bonus symbol is displayed on the display window of the target gaming apparatus.

Subsequently, as shown in FIG. 50, varying of the reel E stops, and the Madonna symbol T2 (bonus symbol) or the Bull symbol T3 (bonus symbol) is displayed on the display window E2 of the target gaming machine E in accordance with the determined link attraction data (ST 3216). Thus, since the condition of switching to the win condition has been fulfilled in the step ST 328 as described above, the player is notified of commencement of a bonus game and the bonus game is played.

In the attraction described above, the character symbol t1 sequentially moves to the display window E2 that is varying on which a bonus symbol is displayed. As a result, the player experiences a novel feeling and his or her expectations to obtain a bonus are gradually raised. On the other hand, the character symbol t1 is displayed on the display window D2 that is adjacent to the varying reel image E. The player can feel the character symbol t1 make the bonus symbol stop and his or her attention is attracted to the character symbol t1. Furthermore, the player's sense of expectancy is maintained for a long period of time by stopping the key symbol first and the bonus symbol last.

While it has been described in the present embodiment that the neighboring gaming apparatuses A to D and the target gaming apparatus E are linearly aligned as shown in FIG. 45, this does not limit the present invention. The neighboring gaming apparatuses A to D and the target gaming apparatus may be disposed in any form as long as players can enjoy the character symbols move from one gaming apparatus to another. The neighboring gaming apparatuses and the target gaming apparatus may be disposed in the form of, for example, a rectangular or circular shape. The character symbol may move among the neighboring gaming apparatuses and the target gaming apparatus repeatedly for a predetermined number of, for example, rounds or period. Moreover, the management server 54 may identify the neighboring gaming apparatuses, for example, in accordance with a table stored therein.

Figure 51:
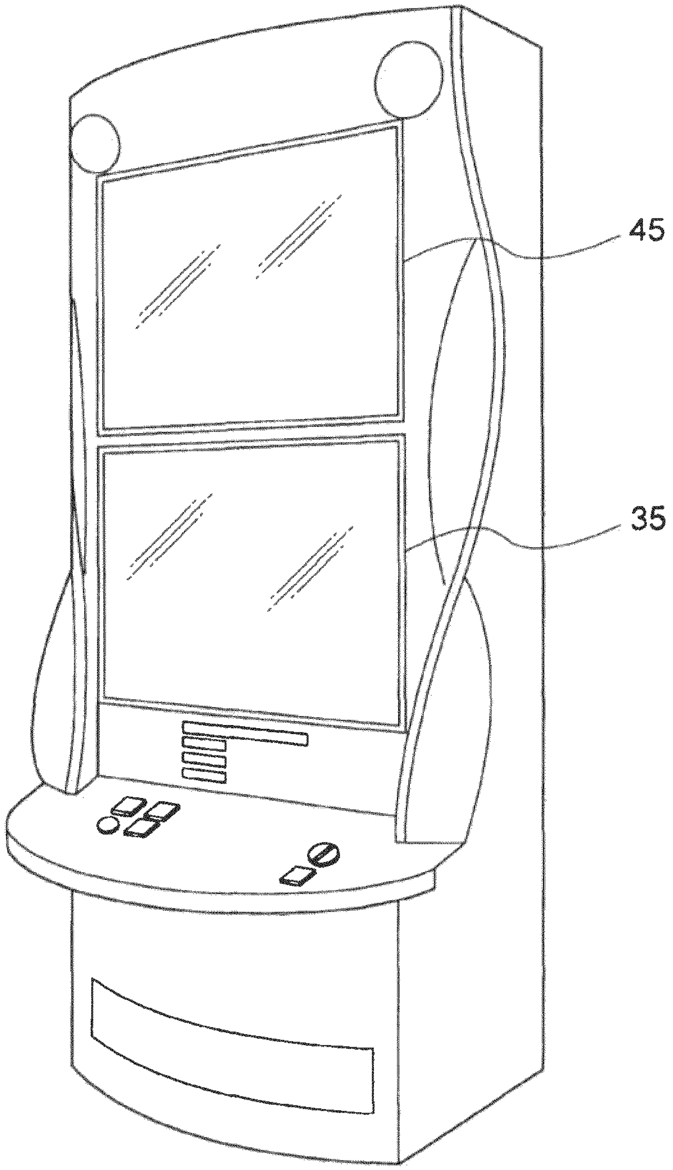
FIG. 51 is a perspective view of another example of gaming apparatus of the second embodiment.
Figure 52:
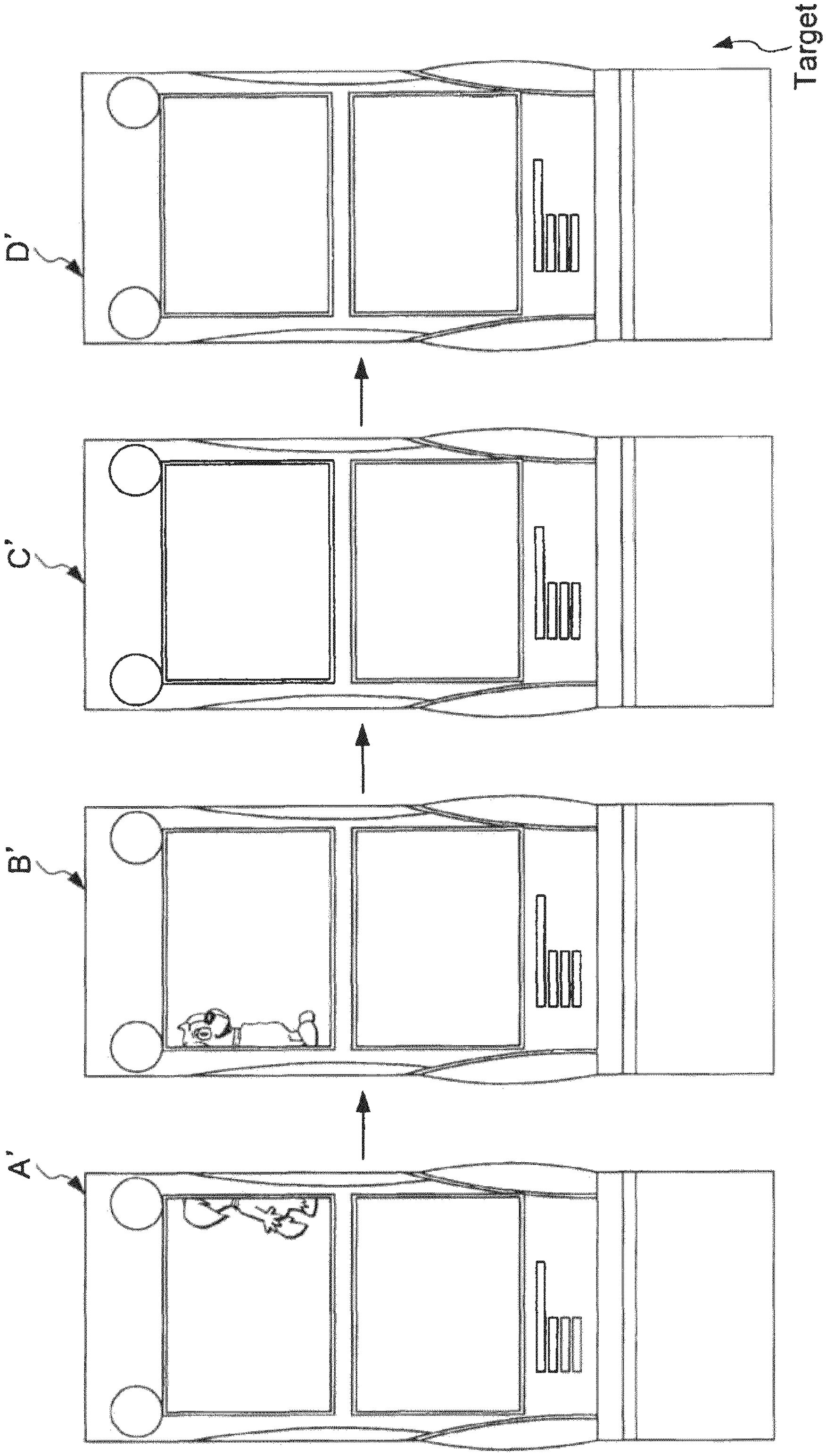
FIG. 52 is a diagram explaining how a character symbol moves through neighboring gaming apparatuses of the type shown in FIG. 51.
Figure 53:
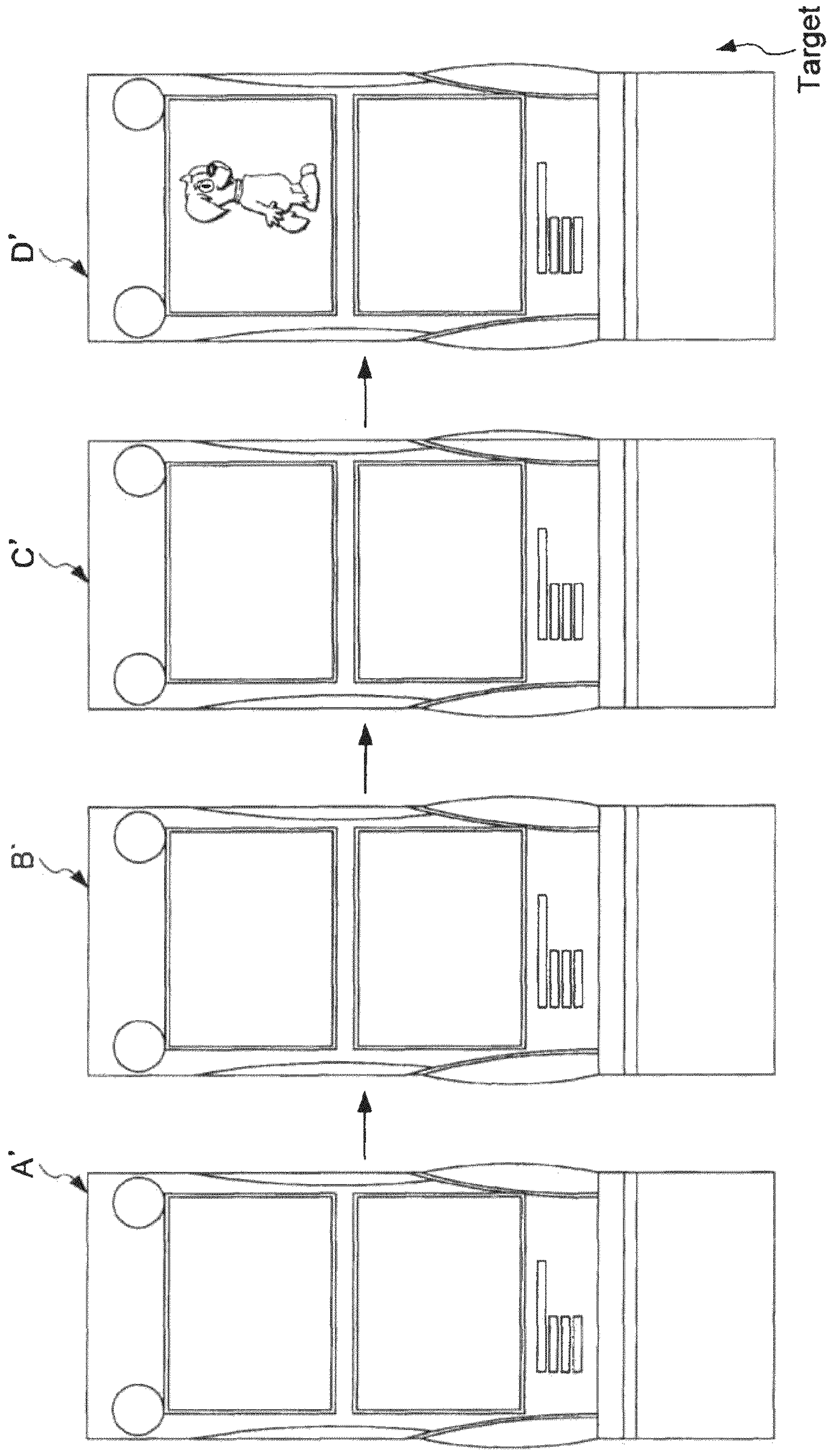
FIG. 53 is a diagram similar to FIG. 52 but showing that the character symbol arrives at a target gaming apparatus.

FIG. 51 is an external view of an example of a gaming machine of the second embodiment. According to the present invention, the gaming apparatus may include two crystal display devices 35 and 45, one of which is used for displaying reels and the other one of which is used for displaying link attractions. FIG. 52 is a diagram explaining how the character symbol moves through gaming apparatuses A', B', C', and D' of the type shown in FIG. 51, and FIG. 53 is a diagram showing that the character symbol arrives at the target gaming apparatus D'.

Further, though it has been described in the present embodiment that the gaming apparatuses carry out the WIN lamp lighting process shown in FIG. 44, this does not limit the present invention. The neighboring one or more gaming apparatuses and the target gaming apparatus according to the present invention may carry out any kind of link attraction as long as the link attraction is performed uniformly. This means that the neighboring one or more gaming apparatuses and the target gaming apparatus may carry out the same link attraction concurrently.

According to the present invention, an internal winning attraction of a prize pattern is determined by referring to internal winning information sent from multiple gaming apparatuses. Since gaming results of other player instead of a player's own gaming results are referred to, a player finds difficulty in understanding a determination process of internal winging attraction, offering the element of surprise in the attraction timing and enhancing the excitement of a game.

A player concentrates on internal winning attraction carried out in the other player's gaming apparatus next to him as well as his own gaming apparatus when considering whether his own gaming apparatus has internally won. For example, a player can have expectation that the internal prize pattern carried out in the gaming apparatus next to him has been in fact caused by the bonus internal winning information of his own gaming machine, offering enhanced excitement of the gaming.

What is claimed is:

1. A gaming system, comprising:

a plurality of gaming apparatuses, each of which has a display device including reels and pays out when a prize is generated;

a control and management device which determines a link attraction based on gaming information sent from each of the plurality of gaming apparatuses, wherein the control and management device is operative (i) to identify a target gaming apparatus in which a prize is generated and at least one neighboring gaming apparatus disposed in a vicinity of the target gaming apparatus from among the plurality of gaming apparatuses, based on the gaming information, (ii) to judge whether the link attraction for the plurality of gaming apparatuses has already been determined, when the gaming information is winning information, (iii) to determine the link attraction by reference to a link attraction mode lottery table stored in a memory, if it is determined the link attraction has not yet been determined, and (iv) to determine a unit number so that the target gaming apparatus with the unit number receives the determined link attraction, and, subsequently, to send the link attraction to the target gaming apparatus with the unit number and the at least one neighboring gaming apparatus, the display device of each of the target gaming apparatus and the at least one neighboring gaming apparatus is operative to display a predetermined character according to the link attraction, after one of the at least one neighboring gaming apparatus displays a symbol including the predetermined character on the reels of the display device according to the link attraction, the predetermined character displayed on said one of the at least one neighboring gaming apparatus moves through the display device of the at least one neighboring gaming apparatus toward the target gaming apparatus according to the link attraction, and the target gaming apparatus is operative to display a bonus symbol on the reels in response to the predetermined character when the predetermined character arrives at the target gaming apparatus and execute a bonus game after displaying the bonus symbol.

2. The gaming system as set forth in claim 1, wherein the control and management device transmits the link attraction to a gaming information display device that displays the link attraction, the gaming information display device being located above each of the plurality of gaming apparatuses.

3. The gaming system as set forth in claim 1, wherein the control and management device includes link attraction determination means for determining an attraction mode of a link attraction and the unit number, and each of the plurality of gaming apparatuses is identified by a respective unit number.

4. The system as set forth in claim 1, wherein, each time the predetermined character moves to arrive at any one reel of any one of the at least one neighboring gaming apparatus and the target gaming apparatus, the reel at which the predetermined character arrives is stopped to display the predetermined character.

* * * * *